(12) United States Patent
Ikebukuro et al.

(10) Patent No.: US 10,334,833 B2
(45) Date of Patent: Jul. 2, 2019

(54) SPINNING REEL

(71) Applicant: Shimano Inc., Sakai, Osaka (JP)

(72) Inventors: Satoshi Ikebukuro, Sakai (JP); Kei Saito, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 140 days.

(21) Appl. No.: 15/431,178

(22) Filed: Feb. 13, 2017

(65) Prior Publication Data
US 2017/0258063 A1    Sep. 14, 2017

(30) Foreign Application Priority Data

Mar. 10, 2016    (JP) .................................. 2016-047586

(51) Int. Cl.
| | | |
|---|---|---|
| *A01K 89/01* | (2006.01) | |
| *A01K 89/015* | (2006.01) | |
| *A01K 89/00* | (2006.01) | |

(52) U.S. Cl.
CPC ........ *A01K 89/0183* (2015.05); *A01K 89/006* (2013.01); *A01K 89/01* (2013.01)

(58) Field of Classification Search
CPC .......... A01K 89/004; A01K 89/011223; A01K 89/0183
See application file for complete search history.

(56) References Cited

U.S. PATENT DOCUMENTS

| | | | | |
|---|---|---|---|---|
| 4,196,867 A | * | 4/1980 | Miller | .................... A01K 89/01 242/249 |
| 4,368,856 A | | 1/1983 | Neufeld | |
| 4,524,923 A | * | 6/1985 | Tunoda | ................ A01K 89/004 242/245 |
| 4,577,807 A | | 3/1986 | Urso | |
| 4,732,343 A | * | 3/1988 | Maruyama | ........... A01K 89/006 242/282 |
| 5,118,048 A | * | 6/1992 | Childre | ................ A01K 89/027 242/245 |

(Continued)

FOREIGN PATENT DOCUMENTS

| | | |
|---|---|---|
| JP | 2010273629 A | 12/2010 |
| JP | 2014023432 A | 2/2014 |

OTHER PUBLICATIONS

Extended European Search Report dated Jul. 20, 2017 for corresponding EP Application No. 17155764.8, 10 pp.

*Primary Examiner* — Emmanuel M Marcelo
(74) *Attorney, Agent, or Firm* — United IP Counselors, LLC

(57) ABSTRACT

A spinning reel that forwardly releases a fishing line includes a reel unit, a handle, a drive shaft, a joint structure, and a rotation transmission mechanism. The handle includes a handle shaft and a handle arm, the handle shaft is rotatably supported by the reel unit at a first position, and the handle arm is mounted to the handle shaft and is unitarily rotatable with the handle shaft. The handle arm extends in a radial direction from a rotational axis of the handle shaft. The drive shaft includes a first end and a second end disposed opposite to the first end, and is rotatably supported by the reel unit at a second position different from the first position. The joint structure joins the handle shaft and the drive shaft, and the handle shaft is unitarily rotatable with the drive shaft.

19 Claims, 10 Drawing Sheets

(56) References Cited

U.S. PATENT DOCUMENTS

| | | | | |
|---|---|---|---|---|
| 5,372,323 A * | 12/1994 | Hirano | ............... | A01K 89/029 |
| | | | | 242/299 |
| 5,605,298 A * | 2/1997 | Shimozaki | ........... | A01K 89/006 |
| | | | | 242/231 |
| 2002/0130209 A1* | 9/2002 | Noda | ............... | A01K 89/0114 |
| | | | | 242/279 |
| 2014/0084096 A1* | 3/2014 | Inoue | ................... | F16H 55/08 |
| | | | | 242/249 |
| 2015/0115087 A1* | 4/2015 | Ohara | ............... | F16C 32/0406 |
| | | | | 242/223 |
| 2015/0164056 A1* | 6/2015 | Inoue | ................... | A01K 89/01 |
| | | | | 242/249 |

* cited by examiner

SPINNING REEL

CROSS-REFERENCE TO RELATED APPLICATIONS

This application claims priority to Japanese Patent Application No. 2016-047586 filed on Mar. 10, 2016, the entirety of which is hereby incorporated by reference in its entirety.

BACKGROUND

Technical Field

The present disclosure relates to a fishing reel, and particularly to a spinning reel that forwardly releases a fishing line.

Background Information

A spinning reel directionally moves a spool back-and-forth for winding a fishing line, and simultaneously, rotates a rotor in conjunction with a rotation of a handle. Accordingly, the fishing line is wound about the spool. The rotation of the handle is transmitted to the rotor through a drive gear. The drive gear is integrally or separately mounted to a drive shaft rotatably supported by a reel unit, and is unitarily rotatable with the drive shaft. The drive gear is meshed with a pinion gear that rotates the rotor. The drive shaft is rotatably supported by the reel unit. The handle includes a handle shaft and a handle arm extending in a radial direction from a rotational axis of the handle shaft. The handle shaft is directly joined to the drive shaft either by a combination of a non-circular engagement and a pin member (see e.g., Japan Laid-open Patent Application Publication No. 2010-273629) or by a threaded connection (see e.g., Japan Laid-open Patent Application Publication No. 2014-023432).

In each of the spinning reels described in Japan Laid-open Patent Application Publications Nos. 2010-273629 and 2014-023432, the drive shaft and the handle are directly joined. Therefore, the following situation might occur. When a load is exerted on the handle, the drive shaft might tilt. The drive gear provided on the drive shaft would then also tilt while meshed with the pinion gear. This might result in a deformation of either or both of the drive gear and the pinion gear.

BRIEF SUMMARY

It is an object of the present disclosure to inhibit a deformation of either or both of a drive gear and a pinion gear even when a load is exerted on a handle.

A spinning reel according to the present disclosure is a reel that forwardly releases a fishing line. The spinning reel includes a reel unit, a handle, a drive shaft, a joint structure, a rotation transmission mechanism, a spool for winding the fishing line, and a rotor. The handle includes a handle shaft and a handle arm. The handle shaft is rotatably supported by the reel unit. The handle arm is mounted to the handle shaft so as to be unitarily rotatable with the handle shaft. The handle arm extends in a radial direction of the handle shaft. The drive shaft includes a first end and a second end located oppositely to the first end. The drive shaft is rotatably supported by the reel unit in a different position from the handle shaft. The joint structure joins the handle shaft and the drive shaft such that the handle shaft and the drive shaft are unitarily rotatable. The rotation transmission mechanism includes a drive gear and a pinion gear. The drive gear is mounted to the drive shaft so as to be unitarily rotatable with the drive shaft. The pinion gear is disposed in a back-and-forth direction so as to be skew to the drive shaft. The pinion gear is meshed with the drive gear. The spool for winding the fishing line is supported by the reel unit so as to be movable back and forth. The rotor is coupled to the pinion gear so as to be unitarily rotatable with the pinion gear at least in a fishing line winding direction. The rotor winds the fishing line about the spool.

In the spinning reel, the handle shaft and the drive shaft are rotatably supported by the reel unit in different positions. The handle shaft and the drive shaft, which are separately supported, are joined by the joint structure so as to be unitarily rotatable with each other. The handle shaft and the drive shaft, which are supported in different positions, are joined through the joint structure. Therefore, the drive shaft is unlikely to tilt even when a load is exerted on the handle. Consequently, even when a load is exerted on the handle, deformation of either or both of the drive gear and the pinion gear can be inhibited.

The joint structure can detachably join the handle shaft and the drive shaft to each other in an axial direction. According to this construction, a slight gap is produced between the handle shaft and the drive shaft. Hence, even when a load is exerted on the handle shaft, the drive shaft is less likely to tilt. Additionally, the handle shaft is attachable to either of the first and second ends of the drive shaft.

The reel unit can include a first body and a second body. The first body can support the first end of the drive shaft such that the first end is rotatable. The first body can support the pinion gear such that the pinion gear is rotatable. The second body can support the second end of the drive shaft such that the second end is rotatable. The second body forms a mechanism mount space together with the first body, the mechanism mount space being between the first body and the second body. The mechanism mount space accommodates the rotation transmission mechanism. According to this construction, the drive shaft can be supported by the first body and the second body. Hence, the drive shaft can be easily assembled to the reel unit.

The first body can include a first drive shaft support part to which a first bearing is mounted. The first bearing supports the first end of the drive shaft such that the first end is rotatable. The second body can include a second drive shaft support part to which a second bearing is mounted. The second bearing supports the second end of the drive shaft such that the second end is rotatable. The reel unit can include a handle shaft support portion. The handle shaft support portion is disposed away from one of the first drive shaft support part and the second drive shaft support part in the axial direction. The handle shaft support portion enables at least one third bearing to be mounted to the handle shaft support portion. The at least one third bearing supports the handle shaft such that the handle shaft is rotatable. According to this construction, the drive shaft and the handle shaft are separately supported. Hence, the drive shaft and the handle shaft can be easily assembled to the reel unit.

The reel unit can include a cover member. The cover member covers an outer lateral surface of the first or second body to which the at least one third bearing is not mounted. According to this construction, the outer lateral surface of the first or second body to which the at least one third bearing is not mounted is thus covered with the cover member. Hence, foreign objects (liquid, fishing bait, etc.) become unlikely to intrude into the interior of the reel body.

The handle shaft support portion can be permanently mounted to at least one of the first body and the second body. Hence, the rotational axis of at least one of the first and second drive shaft support parts and that of the handle shaft support portion can be arranged with good precision.

The reel unit can include a retainer member. The retainer member is detachably mountable to one of the first body and the second body. The retainer member retains the at least one third bearing. The cover member can be detachably mountable to the other of the first body and the second body by a mount structure of a same type as the retainer member. According to this construction, the mount structure of the retainer member and that of the cover member can be of the same type. Hence, even when the handle shaft support portion is non-detachable, it is easy for a user to perform a positional change of the handle (from a position in the spinning reel of a right handle type to a position in the spinning reel of a left handle type or vice versa) in accordance with a preference of the user or so forth.

The handle shaft support portion can be detachably mountable to one of the first body and the second body. According to this construction, the handle shaft support portion, supporting the handle shaft, is mountable to either of the first and second bodies. Hence, the position of the handle can be changed (from the position in the spinning reel of the right handle type to the position in the spinning reel of the left handle type or vice versa) in accordance with a preference of the user or so forth.

The cover member can be detachably mountable to the other of the first body and the second body by a mount structure of a same type as the handle shaft support portion. According to this construction, the mount structure of the handle shaft support portion and that of the cover member can be of the same type. Hence, it is easy for the user to perform a positional change of the handle (from the position in the spinning reel of the right handle type to the position in the spinning reel of the left handle type or vice versa) in accordance with a preference of the user or so forth.

The joint structure can include a recess and a protrusion. The recess is provided on one of the handle shaft and the drive shaft. The protrusion is provided on the other of the handle shaft and the drive shaft, and is engaged with the recess so as to be unitarily rotatable with the recess. According to this construction, the handle shaft and the drive shaft are joined by a protrusion-recess fitting. Hence, the joint structure can be simply constructed.

The recess and the protrusion can be engaged by a non-circular engagement. According to this construction, the drive shaft and the handle shaft can be joined to each other in a unitarily rotatable manner with a simple construction using a non-circular engagement. The non-circular shape used in this non-circular engagement is a polygon, a rectangular shape with rounded ends, or so forth.

The recess can be recessed on the drive shaft along the axial direction, whereas the protrusion can protrude from the handle shaft along the axial direction. According to this construction, without elongating the drive shaft in the axial direction, it is possible to simply construct the joint structure whereby the drive shaft and the handle shaft are unitarily rotatable, axially movable, and detachably attached to each other.

The drive shaft can include a support hole. The support hole has a circular shape and is opened in the recess. The handle shaft can include a supported part. The supported part has a circular shape and protrudes further from the protrusion in the axial direction. The supported part is fitted to the support hole. According to this construction, the handle shaft is also supported by the drive shaft, which is unitarily rotated with the handle shaft. Hence, the handle shaft becomes unlikely to tilt on its own.

The supported part can include a relief part and a fitting part. The relief part extends from the protrusion in the axial direction. The relief part is separated by a gap from the support hole. The fitting part has a larger diameter than the relief part. The fitting part contacts the support hole. According to this construction, a tilt of the handle shaft can be prevented by the fitting part, while the supported part can be easily attached to the support hole by the relief part.

The fitting part can be elastically fitted to the support hole. According to this construction, the fitting part is elastically fitted to the support hole. Hence, a wobble of the drive shaft can be inhibited.

According to the present disclosure, it is possible to inhibit deformation of either or both of the drive gear and the pinion gear even when a load is exerted on the handle.

BRIEF DESCRIPTION OF THE DRAWINGS

Referring now to the attached drawings which form a part of this original disclosure.

DETAILED DESCRIPTION OF EMBODIMENTS

First Preferred Embodiment

Figure 1:
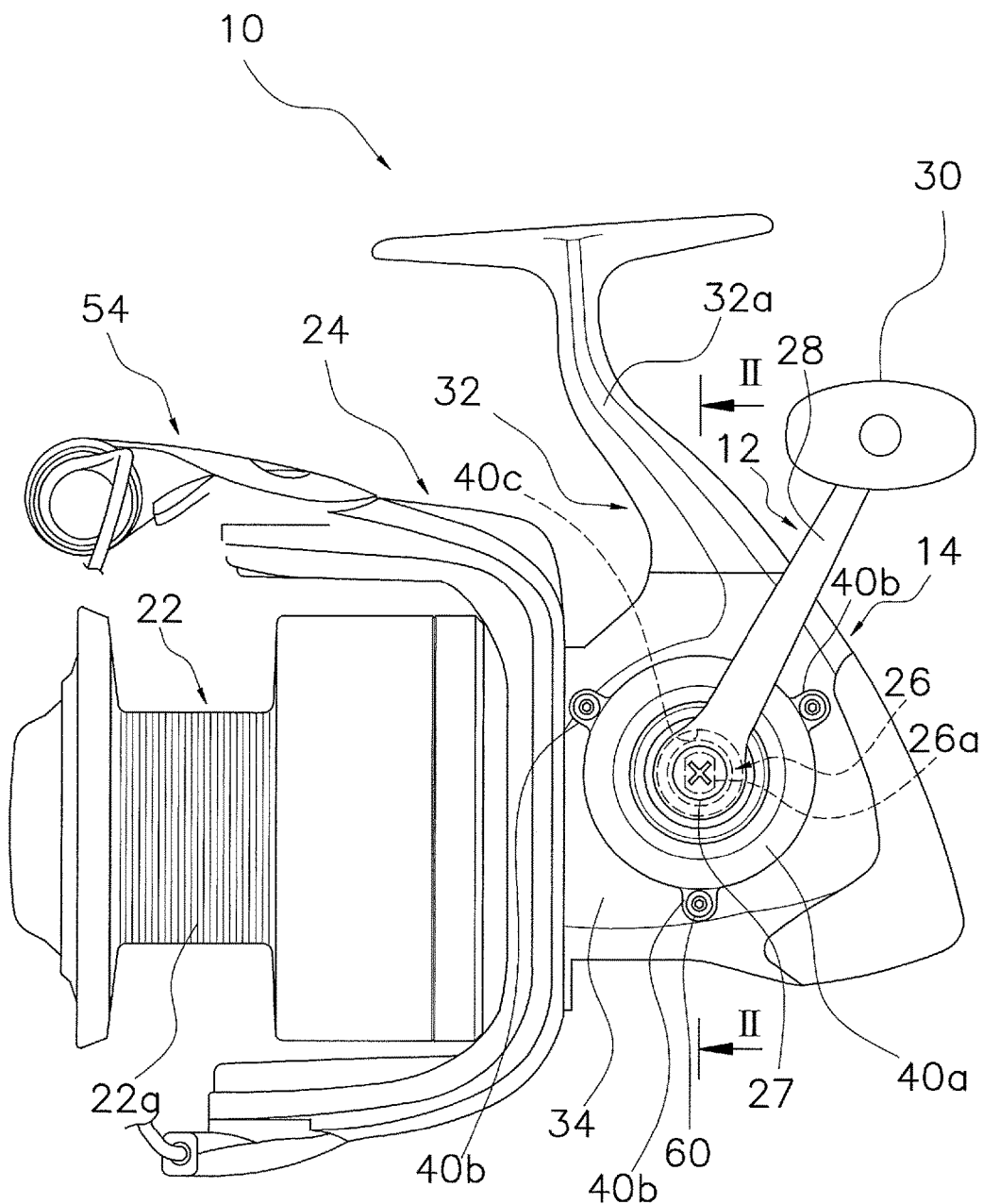
FIG. 1 is a side view of a spinning reel according to a first preferred embodiment of the present disclosure.
Figure 2:
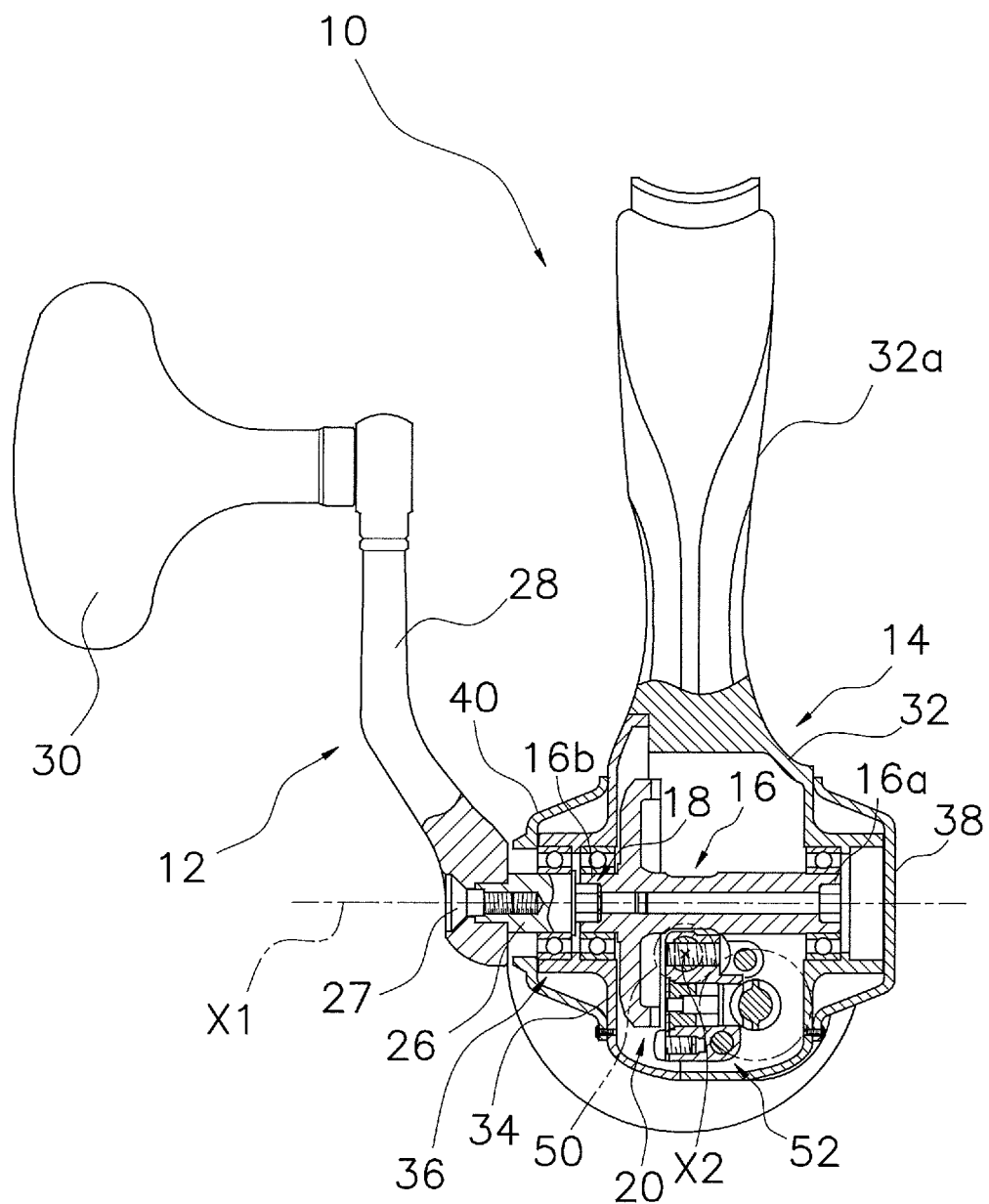
FIG. 2 is a cross-sectional view of the spinning reel taken along cutaway line II-II in FIG. 1.
Figure 5:
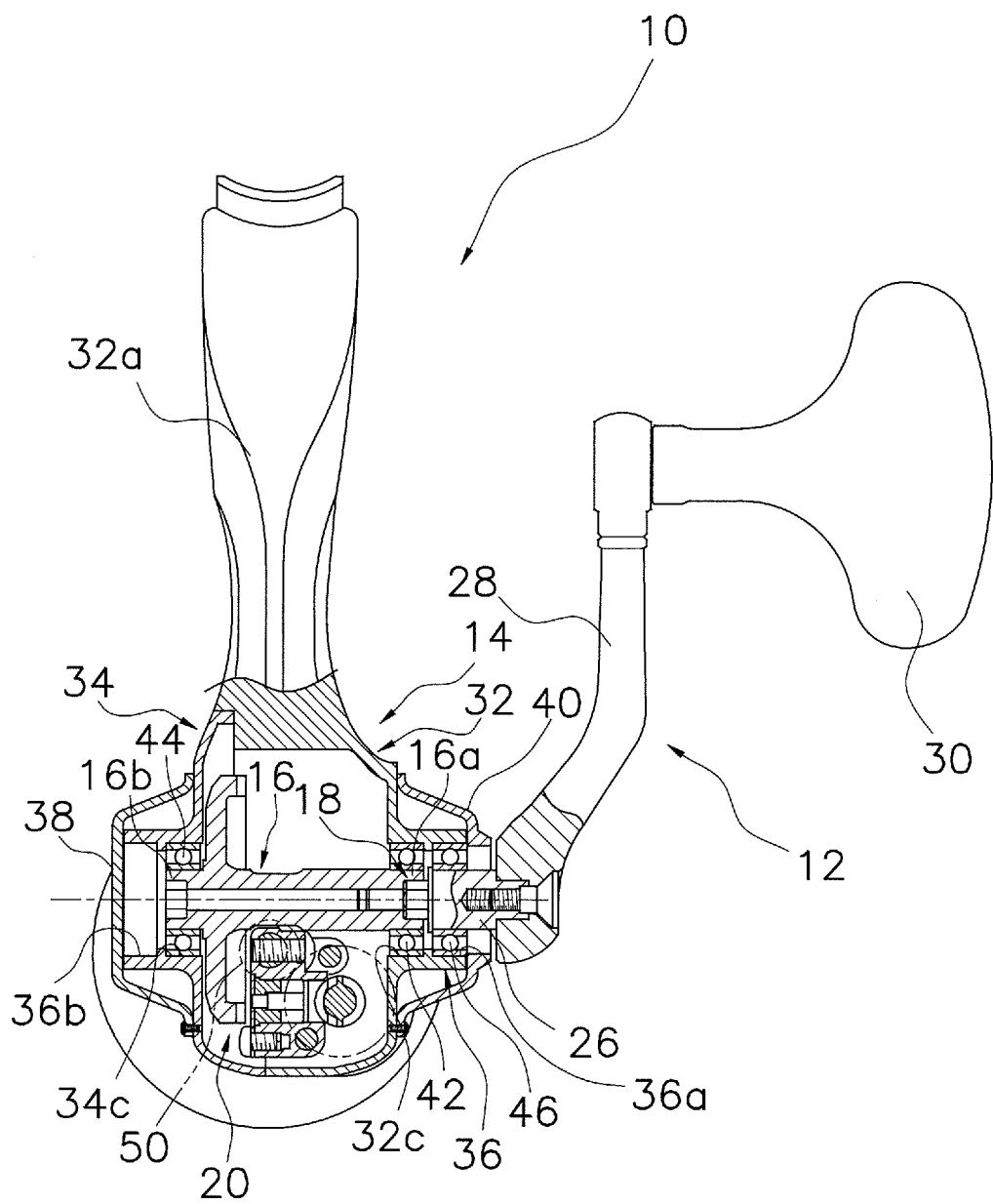
FIG. 5 is a cross-sectional view of the spinning reel used as a right handle type and corresponds to FIG. 2.

As shown in FIGS. 1 and 2, a spinning reel 10 according to a first preferred embodiment of the present disclosure is a reel that forwardly releases a fishing line. The spinning reel 10 includes a handle 12, a reel unit 14, a drive shaft 16 (see FIG. 2) including a first end 16a and a second end 16b, a joint structure 18 (see FIG. 2), a rotation transmission mechanism 20 (see FIG. 2), a spool 22 and a rotor 24. The spinning reel 10 shown in FIGS. 1 and 2 is of a left handle type that the handle 12 is mounted to the left side as seen from behind. However, as shown in FIG. 5, the spinning reel 10 can be used as a right handle type that the handle 12 is mounted to the right side as seen from behind.

<Handle>

As shown in FIGS. 1 and 2, the handle 12 includes a handle shaft 26 and a handle arm 28. The handle shaft 26 is supported by the reel unit 14 and is rotatable about a first axis X1 arranged in a right-and-left direction. The handle arm 28 is mounted to the handle shaft 26 and is unitarily rotatable with the handle shaft 26, and extends in the radial direction of the handle shaft 26. A handle knob 30 is mounted to the tip of the handle arm 28 and is rotatable about an axis arranged in parallel to the handle shaft 26.

Figure 3:
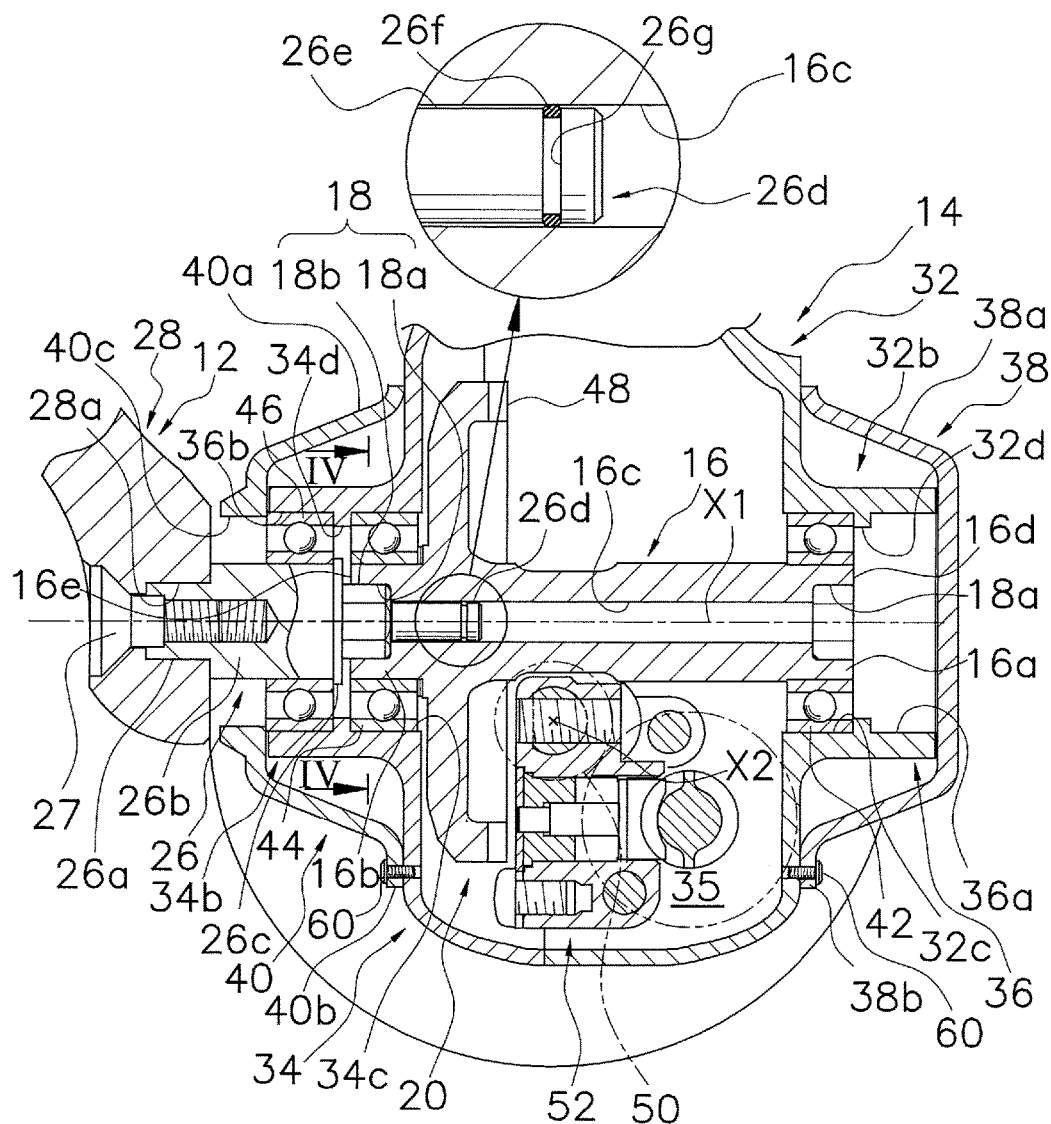
FIG. 3 is an enlarged cross-sectional view of major constituent elements in FIG. 2.

As shown in FIG. 3, the handle shaft 26 is detachably mounted to the handle arm 28 by a fixation bolt 27. The fixation bolt 27 is screwed into the handle shaft 26 while penetrating the handle arm 28. The handle shaft 26 can be joined to either of the first end 16a and the second end 16b of the drive shaft 16 through the joint structure 18. The joint structure 18 is an example of a joining means. The handle shaft 26 includes a joint part 26a, a shaft part 26b, an annular protrusion 26c for a retaining purpose and a supported part 26d. As shown in FIG. 1, the joint part 26a is a part to which the handle arm 28 is joined and is unitarily rotatable with the handle arm 28, and a cross-section of the joint part 26a has a non-circular shape (e.g., a rectangular shape, an oval shape (or a rectangular shape with rounded ends) or a hexagonal shape). As shown in FIG. 3, the handle arm 28 is provided with a non-circular hole 28a to be joined to the joint part 26a. The shaft part 26b is rotatably supported by the reel unit 14. The annular protrusion 26c is disposed either between a first bearing 42 (to be described) and a third bearing 46 (to be described) or between a second bearing 44 (to be described) and the third bearing 46. At least one of the first bearing 42, the second bearing 44 and the third bearing 46 is, for instance, a rolling bearing such as a ball bearing, a cylindrical roller bearing or a needle roller bearing. The annular protrusion 26c contacts the inner peripheral part (inner race) of the third bearing 46 and is separated by a gap from the inner peripheral part of the second bearing 44 (or the first bearing 42). The annular protrusion 26c is retained by a retainer member 40 (to be described) through the third bearing 46. With this construction, the handle shaft 26 is retained.

The supported part 26d is provided for making it difficult for the handle shaft 26 supported only by the third bearing 46 to tilt. The supported part 26d protrudes further from a protrusion 18b (to be described) of the joint structure 18, and is fitted to and supported by a support hole 16c (to be described) of the drive shaft 16. In the first preferred embodiment, as shown in a magnified view of FIG. 3, the supported part 26d includes a relief part 26e and a fitting part 26e. The relief part 26e is separated from the support hole 16c by a gap. The fitting part 26f is fitted to the support hole 16c. The relief part 26e is elastically fitted to the support hole 16c through the fitting part 26f. The fitting part 26f is disposed on the tip of the relief part 26e, and is made in the form of, for instance, an O-ring. The relief part 26e is provided with an annular groove 26g on its tip so as to attach the fitting part 26f to the relief part 26e.

<Reel Unit>

As shown in FIGS. 1, 2 and 3, the reel unit 14 includes a first body 32, a second body 34, a handle shaft support portion 36, a cover member 38 and the retainer member 40. The first body 32 supports the first end 16a of the drive shaft 16 such that the first end 16a is rotatable. Simultaneously, the first body 32 supports a pinion gear 50 (to be described) such that the pinion gear 50 is rotatable. The first body 32 includes a fishing rod attachment part 32a. The fishing rod attachment part 32a is a substantially T-shaped part for attaching the spinning reel 10 to a fishing rod.

As shown in FIG. 3, the first body 32 includes a first support part 32b. The first support part 32b has a tubular shape and protrudes axially outward. The first support part 32b includes a first drive shaft support part 32c by which the first end 16a of the drive shaft 16 is rotatably supported. The first bearing 42, by which the first end 16a (the right end in FIG. 3) of the drive shaft 16 is rotatably supported, is mounted to the first drive shaft support part 32c. The first support part 32b is an example of a drive shaft supporting means.

The second body 34 and the first body 32 form a mechanism mount space 35 in which the rotation transmission mechanism 20 can be accommodated between the second body 34 and the first body 32. Additionally, the second body 34 includes a second support part 34b. The second support part 34b has a tubular shape and protrudes axially outward. The second support part 34b includes a second drive shaft support part 34c by which the second end 16b of the drive shaft 16 is rotatably supported. The second bearing 44, by which the second end 16b (the left end in FIG. 3) of the drive shaft 16 is rotatably supported, is mounted to the second drive shaft support part 34c. The second support part 34b is another example of a drive shaft supporting means.

The handle shaft support portion 36 is disposed axially away from either of the first drive shaft support part 32c and the second drive shaft support part 34c. At least one third bearing 46, by which the handle shaft 26 is rotatably supported, can be mounted to the handle shaft support portion 36. The handle shaft support portion 36 is permanently provided on at least either of the first body 32 and the second body 34. In the first preferred embodiment, the handle shaft support portion 36 includes a first handle shaft support part 36a and a second handle shaft support part 36b so as to make the spinning reel 10 usable as both the right handle type and the left handle type. The first handle shaft support part 36a is permanently provided on the first body 32, whereas the second handle shaft support part 36b is permanently provided on the second body 34. The third bearing 46, by which the handle shaft 26 is rotatably supported, is mounted to one of the first and second handle shaft support parts 36a and 36b, but is not mounted to the other.

The first handle shaft support part 36a is provided in the first support part 32b and is disposed axially outside the first drive shaft support part 32c at an interval away from the first drive shaft support part 32c. A first positioning protrusion 32d is disposed between the first drive shaft support part 32c and the first handle shaft support part 36a. The first positioning protrusion 32d is an annularly protruding part for axially positioning the first bearing 42 and the third bearing 46.

The second handle shaft support part 36b is provided in the second support part 34b and is disposed at an interval axially outside the second drive shaft support part 34c. A second positioning protrusion 34d is disposed between the second drive shaft support part 34c and the second handle shaft support part 36b. The second positioning protrusion 34d is an annularly protruding part for axially positioning the second bearing 44 and the third bearing 46.

When the spinning reel 10 is of the left handle type shown in FIG. 2, the third bearing 46 is mounted, as shown in FIG. 3, to the second handle shaft support part 36b integrated with the second drive shaft support part 34c. It should be noted that when the spinning reel 10 is of the right handle type shown in FIG. 5, the third bearing 46 is mounted to the first handle shaft support part 36a integrated with the first drive shaft support part 32c.

The cover member 38 covers the outer lateral surface of the first or second body 32 or 34 to which the third bearing 46 is not mounted. Specifically, the cover member 38 covers either of the first and second support parts 32b and 34b from axially outside. The cover member 38 is detachably mountable to one of the first and second bodies 32 and 34 by the same mount structure as the retainer member 40. The cover member 38 includes a cover part 38a and a plurality of attachment parts 38b (the number of which is preferably from 2 to 6, and is 3 in the present preferred embodiment). The cover part 38a has a saucer shape. The attachment parts 38b radially protrude from the outer peripheral region of the cover part 38a. The plural attachment parts 38b are fixed to either of the first and second bodies 32 and 34 by screw members 60. When the spinning reel 10 is of the left handle type, the plural attachment parts 38b are fixed to the first body 32. On the other hand, when the spinning reel 10 is of the right handle type, the plural attachment parts 38b are fixed to the second body 34. The screw members 60 are an example of a mounting means.

The retainer member 40 is selectively and detachably mounted to the first or second body 32 or 34 to which the third bearing 46 is mounted, whereby the third bearing 46 is retained. The retainer member 40 includes a retainer part 40a, a plurality of attachment parts 40b (the number of which is preferably from 2 to 6, and is 3 in the first preferred embodiment) and a through hole 40c. The retainer part 40a has a saucer shape. The attachment parts 40b radially protrude from the outer peripheral region of the retainer part 40a. The through hole 40c penetrates the center of the retainer part 40a. The inner diameter of the through hole 40c is smaller than the outer diameter of the third bearing 46. With this construction, the third bearing 46 is retained. Moreover, the annular protrusion 26c of the handle shaft 26 contacts the inner peripheral part of the third bearing 46. Accordingly, the handle shaft 26 is retained. The plural attachment parts 40b are provided in the same positions as the plural attachment parts 38b in the radial and circumferential directions. The plural attachment parts 40b are fixed to either of the first and second bodies 32 and 34 by the screw members 60. When the spinning reel 10 is of the left handle type, the plural attachment parts 40b are fixed to the second body 34. On the other hand, when the spinning reel 10 is of the right handle type, the plural attachment parts 40b are fixed to the first body 32.

<Drive Shaft>

The drive shaft 16 is rotatably supported by the reel unit 14 in a different position from the handle shaft 26. As described above, the drive shaft 16 is rotatably supported by the first drive shaft support part 32c of the first body 32 and the second drive shaft support part 34c of the second body 34 through the first bearing 42 and the second bearing 44. The drive shaft 16 is provided with a drive gear 48. The drive gear 48 composes part of the rotation transmission mechanism 20 and is unitarily rotatable with the drive shaft 16. In the present preferred embodiment, the drive gear 48 is integrated with the drive shaft 16. However, the drive gear 48 can be constructed separately from the drive shaft 16 and be unitarily rotatable with the drive shaft 16. The drive shaft 16 is provided with the circular support hole 16c in its center so as to support the handle shaft 26.

<Joint Structure>

Figure 4:
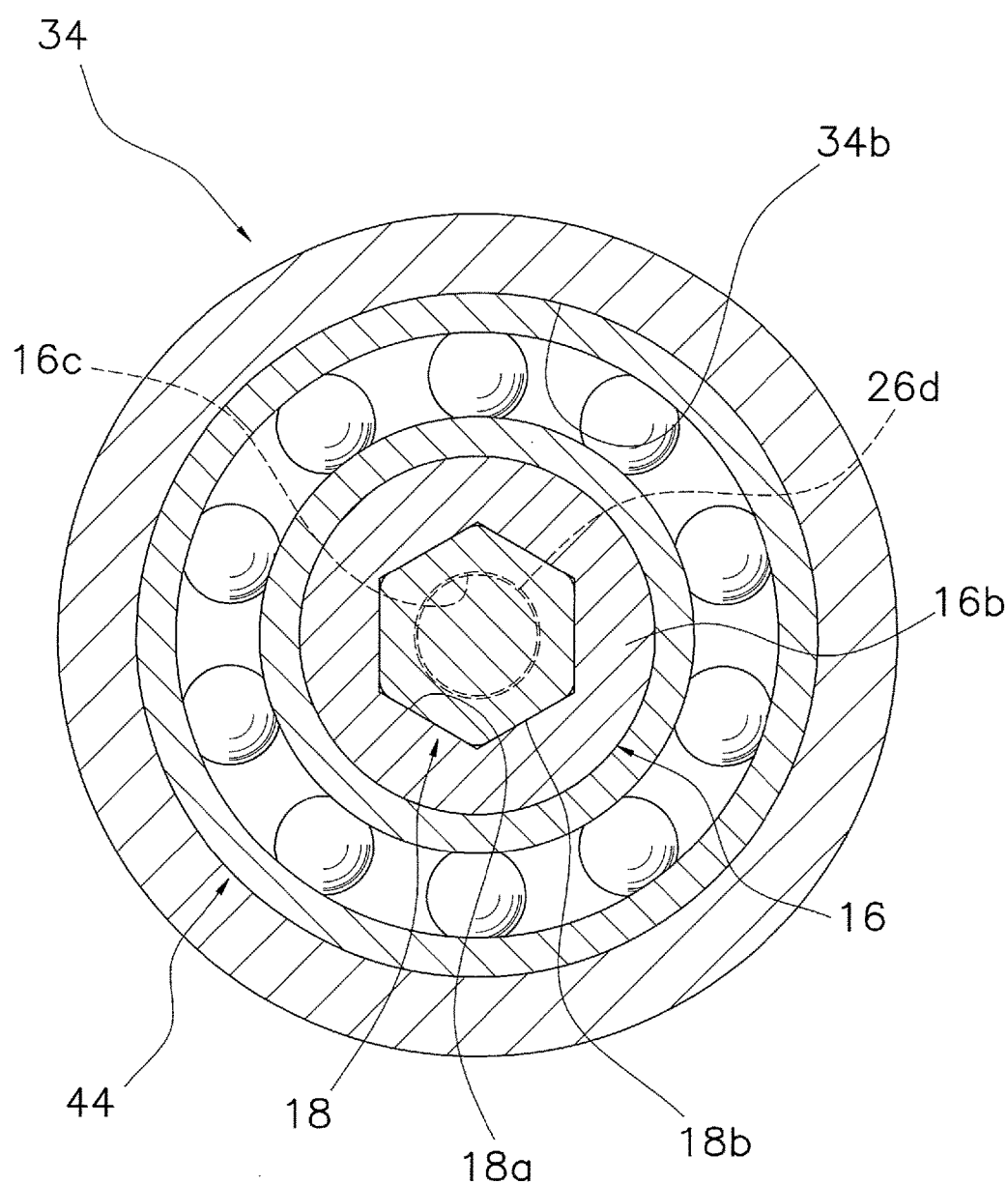
FIG. 4 is a cross-sectional view of FIG. 3 taken along cutaway line IV-IV in FIG. 3.

As shown in FIGS. 3 and 4, the joint structure 18 includes a recess 18a and the protrusion 18b. The recess 18a is provided on one of the handle shaft 26 and the drive shaft 16. The protrusion 18b is provided on the other of the handle shaft 26 and the drive shaft 16. The protrusion 18b is engaged with the recess 18a by a non-circular engagement and is unitarily rotatable with the recess 18a. In the present preferred embodiment, a pair of recesses 18a is provided on the drive shaft 16 along the axial direction. Specifically, the first recess of the pair of recesses 18a is provided on a first end surface 16d of the first end 16a, and the second recess of the pair of recesses 18a is provided on a second end surface 16e of the second end 16b. The protrusion 18b is provided to protrude from the annular protrusion 26c along the axial direction.

As shown in FIG. 3, the support hole 16c is opened in the pair of recesses 18a. As shown in FIG. 4, the pair of recesses 18a and the single protrusion 18b have non-circular cross-sections. In the first preferred embodiment, each of the cross-sections has a hexagonal shape. The pair of recesses 18a and the single protrusion 18b are not limited to have hexagonal cross-sections, and can have any shape of cross-sections as long as the cross-sections have a non-circular shape (a polygonal shape or so forth) whereby the pair of recesses 18a and the single protrusion 18b are unitarily rotatable.

<Rotation Transmission Mechanism>

As shown in FIG. 3, the rotation transmission mechanism 20 includes the drive gear 48 and the pinion gear 50 meshed with the drive gear 48. The pinion gear 50 is rotated about a second axis X2 arranged in a back-and-forth direction skew to the first axis X1. The rotor 24 is coupled to the tip of the pinion gear 50 and is unitarily rotatable with the pinion gear 50. The pinion gear 50 is prevented from rotating in a fishing line releasing direction.

<Spool>

As shown in FIG. 1, the spool 22 is reciprocated in the direction of a second axis X2 arranged along the back-and-forth direction by an oscillating mechanism 52 (see FIG. 2) that operates in conjunction with the pinion gear 50. As shown in FIG. 1, the spool 22 includes a bobbin trunk 22a, on the outer periphery of which the fishing line is wound by the rotor 24.

<Rotor>

The rotor 24 is rotated in a fishing line winding direction in conjunction with a rotation of the handle 12. The rotor 24 includes a fishing line guide 54. The fishing line guide 54 is rotated on the outer peripheral side of the spool 22. The fishing line guide 54 winds the fishing line onto the bobbin trunk 22a of the spool 22 that moves back and forth in conjunction with the rotor 24 upon a rotation of the rotor 24 in the fishing line winding direction.

<Fishing Line Winding Action of Spinning Reel>

In the spinning reel 10 constructed as described above, the handle shaft 26 is rotated in the fishing line winding direction when a user holds the handle knob 30 and rotates the handle arm 28 in the fishing line winding direction. When prey gets caught in a terminal tackle, the user rotates the handle 12. At this time, a load is exerted on the handle shaft 26 in a direction that the handle shaft 26 is tilted relatively to the first axis X1. Specifically, when a large force is required in winding up the fishing line, the user operates the handle 12 while forwardly pushing the handle knob 30 or backwardly pulling the handle knob 30. In this case, a load is exerted on the handle shaft 26 in a direction that the handle shaft 26 is tilted relatively to the first axis X1. Even when the user applies such a force to the handle shaft 26, the handle shaft 26 and the drive shaft 16 are joined through the joint structure 18 and are supported in different positions. Therefore, even when a load is exerted on the handle 12, the drive shaft 16 is unlikely to tilt. Consequently, even when a load is exerted on the handle 12, deformation of either or both of the drive gear 48 and the pinion gear 50 can be inhibited.

Additionally, the handle shaft 26 and the drive shaft 16 are detachably joined by a non-circular engagement. Hence, a gap is produced between the handle shaft 26 and the drive shaft 16. However, the fitting part 26f of the handle shaft 26 is elastically fitted to the support hole 16c of the drive shaft 16. Hence, a wobble of the drive shaft 16 can be inhibited.

<Changing a Handle Position>

The position of the handle 12 can be changed for using the spinning reel 10 as either the left handle type or the right handle type. When the handle 12 is relocated from its mount position in the spinning reel 10 of the left handle type shown in FIG. 2 to that in the spinning reel 10 of the right handle type shown in FIG. 5, the cover member 38 and the retainer member 40 are detached from the spinning reel 10. Specifically, three screw members 60 are removed from the spinning reel 10.

After removal of the screw members 60, the handle shaft 26 is detached from the drive shaft 16 while the handle arm 28 is held by the hand of a user. At this time, while attached to the handle shaft 26, the third bearing 46 is pressed by the annular protrusion 26c of the handle shaft 26 and is thereby detached from the second handle shaft support part 36b. Therefore, the retainer member 40, the third bearing 46, the handle shaft 26 and the handle arm 28 are taken from the second body 34 and are joined to each other without being separated apart from each other.

Then, the cover member 38, detached from the first body 32, is fixed to the second body 34 by the screw members 60. Next, the supported part 26d of the handle shaft 26 is fitted to the support hole 16c, and the third bearing 46 is mounted to the first handle shaft support part 36a. When it is not easy to mount the third bearing 46 to the first handle shaft support part 36a, the handle arm 28 can be detached from the handle shaft 26. Then, the protrusion 18b is engaged with the recess 18a of the joint structure 18 by rotating the handle arm 28 in the fishing line winding direction. At this time, rotation of the drive shaft 16 can be prevented by holding the rotor 24 with the hand of the user. Finally, the retainer member 40 is fixed to the first body 32 by the screw members 60. The third bearing 46 is thus retained. With this procedure, the spinning reel 10 of the right handle type can be obtained as shown in FIG. 5.

Second Preferred Embodiment

In the following explanation regarding second and subsequent preferred embodiments, a given member is denoted by the same reference sign as its corresponding member of the first preferred embodiment. However, when a given member is constructed differently from its corresponding member of the first preferred embodiment, the given member is denoted by a three-digit reference sign, the last two digits of which correspond to a reference sign assigned to its corresponding member of the first preferred embodiment.

<Handle>

Figure 6:
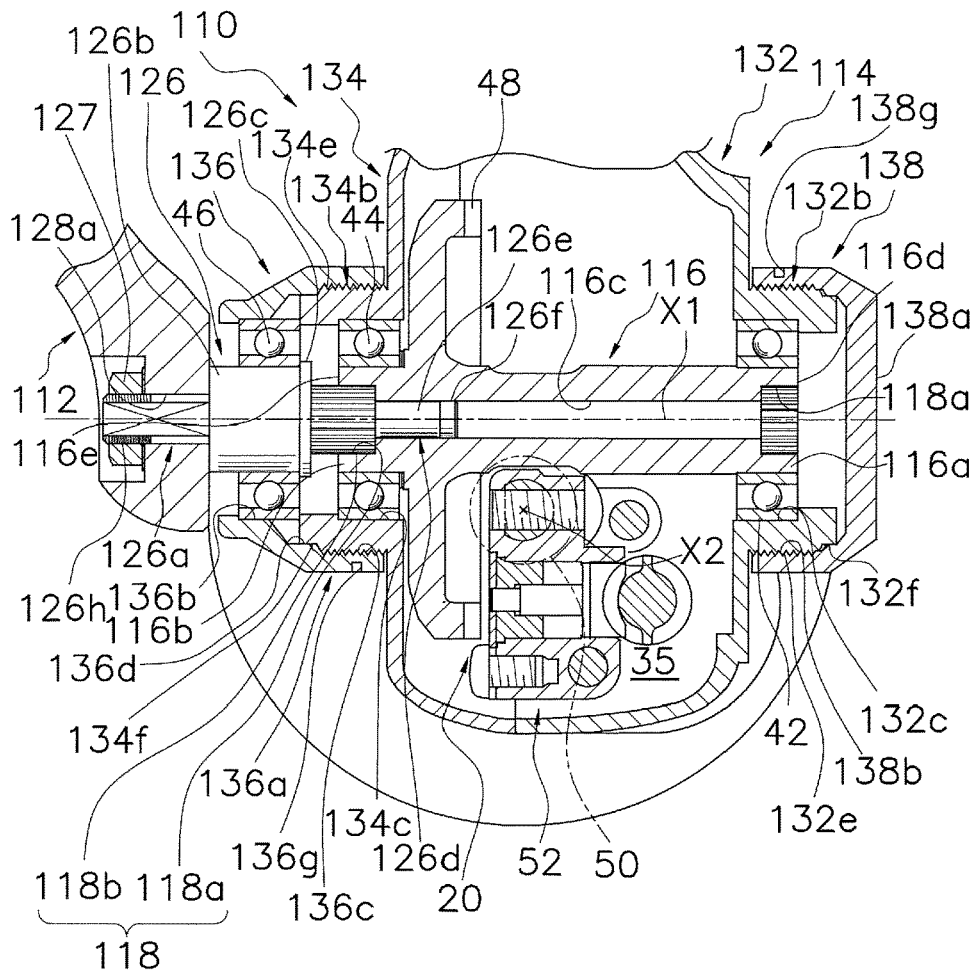
FIG. 6 is an enlarged cross-sectional view of major constituent elements of a spinning reel according to a second preferred embodiment of the present disclosure and corresponds to FIG. 3.

As shown in FIG. 6, in a spinning reel 110 according to the second preferred embodiment, the third bearing 46 is axially positioned by a handle shaft support portion 136 and one of first and second support parts 132b and 134b. Additionally, the handle shaft support portion 136 and a cover member 138 are screwed onto a first body 132 and a second body 134, and are thus detachably fixed to the first body 132 and the second body 134.

In the spinning reel 110, a handle 112 includes a handle shaft 126, a handle arm 128 and the handle knob 30. The handle shaft 126 can be joined to either of a first end 116a and a second end 116b of a drive shaft 116 through a joint structure 118. The joint structure 118 is another example of a joining means. The handle shaft 126 includes a joint part 126a, a shaft part 126b, an annular protrusion 126c for a retaining purpose and a supported part 126d. The handle shaft 126 is detachably fixed to the handle arm 128 by a fixation nut 127. The fixation nut 127 is screwed onto a male threaded part 126h provided on the joint part 126a. The joint part 126a has a non-circular cross-section composed of, for instance, a pair of circular-arc parts and a pair of straight parts. The circular-arc parts are disposed in opposition to each other. The straight parts are disposed in parallel to each other and are connected to both ends of each circular-arc parts. The joint part 126a joins the handle arm 128 to the handle shaft 126, whereby the handle arm 128 is unitarily rotatable with the handle shaft 126. The handle arm 128 is provided with a non-circular hole 128a to be engaged with the joint part 126a. The shaft part 126b is rotatably supported by a reel unit 114. The annular protrusion 126c is disposed either between the first bearing 42 (to be described) and the third bearing 46 (to be described) or between the second bearing 44 (to be described) and the third bearing 46. The handle shaft 126 is retained by the handle shaft support portion 136 (to be described) through the third bearing 46.

The supported part 126d is provided for making it difficult for the handle shaft 126 supported only by the third bearing 46 to tilt. The supported part 126d protrudes from a protrusion 118b (to be described) of the joint structure 118, and is fitted to a support hole 116c (to be described) of the drive shaft 116. In the second preferred embodiment, the supported part 126d is provided with a relief part 126e on its base end located close to the protrusion 118b. The relief part 126e is separated by a gap from the support hole 116c. Additionally, the support part 126d is provided with a fitting part 126f on its tip located apart from the protrusion 118b. The fitting part 126f is fitted to the support hole 116c.

<Reel Unit>

The reel unit 114 includes the first body 132, the second body 134, the handle shaft support portion 136 and the cover member 138. Therefore, the reel unit 114 is not provided with a retainer member. The first body 132 includes the first support part 132b. The first support part 132b has a tubular shape and protrudes outward in the direction of the first axis X1. When the handle shaft support portion 136 is mounted to the first support part 132b, the tip end surface of the first support part 132b contacts an end surface of the outer peripheral part (outer race) of the third bearing 46. The first support part 132b includes a first drive shaft support part 132c, by which the first end 116a of the drive shaft 116 is rotatably supported, on its inner peripheral surface. The first bearing 42, by which the first end 116a (the right end in FIG. 6) of the drive shaft 116 is rotatably supported, is mounted to the first drive shaft support part 132c. The first support part 132b is another example of a drive shaft supporting means. The first support part 132b includes a first male threaded part 132e and a first axis aligning surface 132f on its outer peripheral surface. The first axis aligning surface 132f is located axially outside the first male threaded part 132e. The first male threaded part 132e is provided as a mount for mounting one of the handle shaft support portion 136 and the cover member 138. The first male threaded part 132e is another example of a mounting means. The first axis aligning surface 132f is provided for coaxially aligning the handle shaft support portion 136 with the first body 132.

The second body 134 and the first body 132 form the mechanism mount space 35 in which the rotation transmission mechanism 20 can be accommodated. The mechanism mount space 35 is between the second body 134 and the first body 132. Additionally, the second body 134 includes the second support part 134b. The second support part 134b has a tubular shape and protrudes axially outward. When the handle shaft support portion 136 is mounted to the second support part 134b, the tip end surface of the second support part 134b contacts an end surface of the outer peripheral part (outer race) of the third bearing 46. The second support part 134b includes a second drive shaft support part 134c, by which the second end 116b of the drive shaft 116 is rotatably supported, on its inner peripheral surface. The second support part 134b is another example of a drive shaft supporting means. The second bearing 44, by which the second end 116b (the left end in FIG. 6) of the drive shaft 116 is rotatably supported, is mounted to the second drive shaft support part 134c. The second support part 134b includes a second male threaded part 134e and a second axis aligning surface 134f on its outer peripheral surface. The second axis aligning surface 134f is located axially outside the second male threaded part 134e. The second male threaded part 134e is provided as a mount for mounting the other of the handle shaft support portion 136 and the cover member 138. The second male threaded part 134e is another example of a mounting means. The second axis aligning surface 134f is provided for coaxially aligning the handle shaft support portion 136 with the second body 134.

The handle shaft support portion 136 supports the handle shaft 126 in a different position from the drive shaft 116 such that the handle shaft 126 is rotatable. The handle shaft support portion 136 is designed to be detachably mountable to one of the first and second bodies 132 and 134. The handle shaft support portion 136 includes a support portion body 136a having a stepped tubular shape, a handle shaft mount part 136b, a first female threaded part 136c and an axis aligning part 136d. The handle shaft support portion 136 is an example of a handle shaft supporting means. The support portion body 136a axially positions and retains the third bearing 46 together with an end surface of one of the first and second support parts 132b and 134b, while interposing the third bearing 46 between the first and second support parts 132b and 134b. The support portion body 136a includes a first tool lock part 136g on its outer peripheral surface. A tool for an attachment/detachment can be locked to the first tool lock part 136g. The handle shaft mount part 136b is slightly recessed on the inner peripheral surface of the small diameter part of the support portion body 136a, whereby the third bearing 46 is mountable to the handle shaft mount part 136b. The first female threaded part 136c is provided on the inner peripheral surface of the large diameter part of the support portion body 136a so as to be screwed onto one of the first and second male threaded parts 132e and 134e. The axis aligning part 136d is provided for coaxially aligning the third bearing 46 with one of the first and second bearings 42 and 44. The axis aligning part 136d is fitted onto one of the first and second axis aligning surfaces 132f and 134f. As described above, in the second preferred embodiment, the third bearing 46 is axially positioned by the handle shaft support portion 136 and one of the first and second support parts 132b and 134b.

The cover member 138 is designed to be detachably mountable to the other of the first and second bodies 132 and 134. When the spinning reel 110 is of the left handle type, the cover member 138 is mounted to the first body 132, whereas the handle shaft support portion 136 is mounted to the second body 134. When the spinning reel 110 is of the right handle type, the handle shaft support portion 136 is mounted to the first body 132, whereas the cover member 138 is mounted to the second body 134. The cover member 138 includes a cover part 138a having a saucer shape and a second female threaded part 138b provided on the inner peripheral surface of the cover part 138a. The cover part 138a includes a tool lock part 138g on its outer peripheral surface. The aforementioned or another tool for an attachment/detachment can be locked to the tool lock part 138g. For example, an attachment/detachment of the cover member 138 and that of the handle shaft support portion 136 can be done with the same tool. The second female threaded part 138b is screwed onto the other of the first and second male threaded parts 132e and 134e.

<Drive Shaft>

The drive shaft 116 is rotatably supported by the reel unit 114 in a different position from the handle shaft 126. As described above, the drive shaft 116 is rotatably supported by the first drive shaft support part 132c of the first body 132 and the second drive shaft support part 134c of the second body 134 through the first bearing 42 and the second bearing 44. The drive shaft 116 is provided with the drive gear 48. The drive gear 48 composes part of the rotation transmission mechanism 20 and is unitarily rotatable with the drive shaft 116. The drive shaft 116 is provided with the circular support hole 116c in its center so as to support the handle shaft 126.

<Joint Structure>

Figure 7:
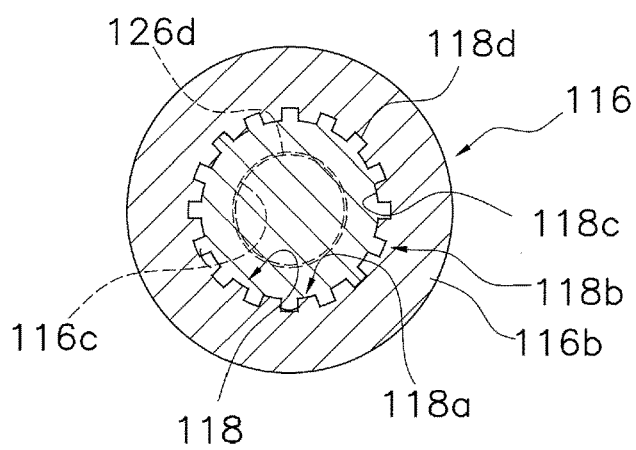
FIG. 7 is a cross-sectional view of some constituent elements (corresponding to major constituent elements in FIG. 4) of the spinning reel according to the second preferred embodiment.

As shown in FIGS. 6 and 7, the joint structure 118 includes a recess 118a and the protrusion 118b. The recess 118a is provided on one of the handle shaft 126 and the drive shaft 116. The protrusion 118b is provided on the other of the handle shaft 126 and the drive shaft 116. The protrusion 118b is engaged with the recess 118a by a non-circular engagement and is unitarily rotatable with the recess 118a. In the second preferred embodiment, as shown in FIG. 7, the recess 118a is provided with internal splines 118c protruding radially inward in a stellate manner. On the other hand, the protrusion 118b is provided with external splines 118d protruding radially outside in a stellate manner. The external splines 118d are engaged with the internal splines 118c. The shape of the entire internal splines 118c and that of the entire external splines 118d are examples of a non-circular shape.

In the second and subsequent preferred embodiments, the rotation transmission mechanism 20, the spool 22 and the rotor 24 are constructed similarly to those of the first preferred embodiment, and therefore, will not be hereinafter explained. Additionally, in the second and subsequent preferred embodiments, the fishing line winding actions of the spinning reels 110, 210, 310, 410 and 510 have advantageous effects similar to the advantageous effect achieved by the spinning reel 10 of the first preferred embodiment, and therefore, will not be hereinafter explained.

<Changing a Handle Position>

The position of the handle 112 can be changed for using the spinning reel 110 as either the left handle type or the right handle type. When the handle 112 is relocated from its mount position in the spinning reel 110 of the left handle type shown in FIG. 6 to that in the spinning reel 110 of the right handle type, the handle shaft support portion 136 and the cover member 138 are detached from the spinning reel 110. Specifically, a user rotates each of the handle shaft support portion 136 and the cover member 138 in a loosening direction with the tool. Accordingly, the handle shaft support portion 136 is detached from the second body 134, whereas the cover member 138 is detached from the first body 132. Next, the handle shaft 126 is detached from the drive shaft 116 while the handle arm 128 is held by the hand of the user. At this time, the third bearing 46 is pressed by the annular protrusion 126c of the handle shaft 126 and is attached to the handle shaft 126. Accordingly, the third bearing 46 is detached and is assembled to the handle shaft support portion 136 and the handle shaft 126. Therefore, the handle shaft support portion 136, the third bearing 46, the handle shaft 126 and the handle arm 128 are taken from the second body 134 and are joined to each other without being separated apart from each other.

Then, the cover member 138, detached from the first body 132, is screwed onto the second body 134 and is thereby fixed to the second body 134. Next, the supported part 126d of the handle shaft 126 is fitted to the support hole 116c from the same side as the first body 132, and the protrusion 118b is engaged with the recess 118a of the joint structure 118 by rotating the handle arm 128 in the fishing line winding direction. At this time, a rotation of the drive shaft 116 can be prevented by holding the rotor 24 with the hand of the user. Finally, the handle shaft support portion 136 is screwed onto the first body 132 and is thereby fixed to the first body 132. The third bearing 46 is thus retained. With this procedure, the spinning reel 110 of the right handle type can be obtained similarly to the spinning reel 10 of the right handle type shown in FIG. 5.

Third Preferred Embodiment

Figures 8, 9:
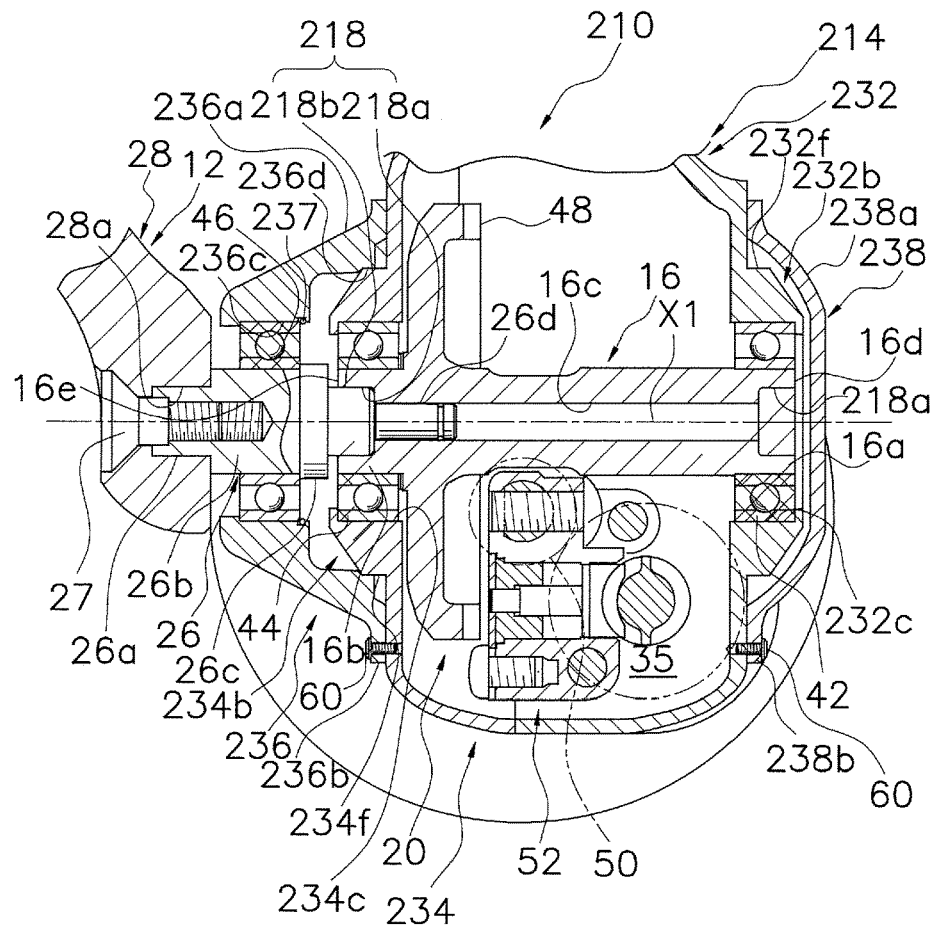
FIG. 8 is an enlarged cross-sectional view of major constituent elements of a spinning reel according to a third preferred embodiment of the present disclosure and corresponds to FIG. 3.
FIG. 9 is a cross-sectional view of some constituent elements (corresponding to the major constituent elements in FIG. 4) of the spinning reel according to the third preferred embodiment.

As shown in FIG. 8, in a spinning reel 210 according to the third preferred embodiment, the third bearing 46 is axially positioned by a handle shaft support portion 236. Additionally, similarly to the first preferred embodiment, the handle shaft support portion 236 and a cover member 238 are detachably fixed to a first body 232 and a second body 234 by the plural screw members 60.

In the spinning reel 210, the constructions of the handle 12 and the drive shaft 16 are approximately the same as those of the first preferred embodiment. Therefore, in FIG. 8, the constituent elements of the handle 12 and those of the drive shaft 16 are denoted by the same reference signs as those in FIG. 3, and will not be hereinafter explained.

<Reel Unit>

A reel unit 214 includes the first body 232, the second body 234, the handle shaft support portion 236 and the cover member 238.

The first body 232 includes a first support part 232b. The first support part 232b has a tubular shape and protrudes outwardly in the direction of the first axis X1. The first support part 232b includes a first drive shaft support part 232c, by which the first end 16a of the drive shaft 16 is rotatably supported, on its inner peripheral surface. The first bearing 42, by which the first end 16a (the right end in FIG. 8) of the drive shaft 16 is rotatably supported, is mounted to the first drive shaft support part 232c. The first support part 232b includes a first axis aligning surface 232f on its outer peripheral surface. The first axis aligning surface 232f is provided for coaxially aligning the handle shaft support portion 236 with the first body 232. The first support part 232b is another example of a drive shaft supporting means.

The second body 234 and the first body 232 form the mechanism mount space 35 in which the rotation transmission mechanism 20 can be accommodated. The mechanism mount space 35 is between the second body 234 and the first body 232. Additionally, the second body 234 includes a second support part 234b. The second support part 234b has a tubular shape and protrudes axially outward. The second support part 234b includes a second drive shaft support part 234c, by which the second end 16b of the drive shaft 16 is rotatably supported, on its inner peripheral surface. The second bearing 44, by which the second end 16b (the left end in FIG. 8) of the drive shaft 16 is rotatably supported, is mounted to the second drive shaft support part 234c. The second support part 234b includes a second axis aligning surface 234f. The second axis aligning surface 234f is provided for coaxially aligning the handle shaft support portion 236 with the second body 234. The second support part 234b is another example of a drive shaft supporting means.

The handle shaft support portion 236 supports the handle shaft 26 in a different position from the drive shaft 16 such that the handle shaft 26 is rotatable. The handle shaft support portion 236 is designed to be detachably mountable to one of the first and second bodies 232 and 234. The handle shaft support portion 236 includes a support portion body 236a, a plurality of attachment parts 236b (the number of which is preferably from 2 to 6, and is 3 in the third preferred embodiment), a handle shaft mount part 236c and an axis aligning part 236d. The handle shaft support portion 236 is another example of a handle shaft supporting means. The support portion body 236a has a taper shape and is provided with an opening in its bottom. The attachment parts 236b radially protrude from the outer peripheral part of the support portion body 236a. The attachment parts 236b are preferably aligned at intervals in the circumferential direction.

The plural attachment parts 236b are fixed to one of the first and second bodies 232 and 234 by the screw members 60. When the spinning reel 210 is of the left handle type, the plural attachment parts 236b are fixed to the second body 234. On the other hand, when the spinning reel 210 is of the right handle type, the plural attachment parts 236b are fixed to the first body 232.

The handle shaft mount part 236c is slightly recessed on the inner peripheral surface of the small diameter part of the support portion body 236a. The handle shaft mount part 236c is designed as a mount for mounting the third bearing 46. The third bearing 46 is retained by the handle shaft mount part 236c, and is positioned so as not to be axially moved to both sides. A retainer spring 237 is mounted to the handle shaft mount part 236c. The retainer spring 237 is made of an elastic wire material.

The axis aligning part 236d is provided for coaxially aligning the third bearing 46 with either of the first and second bearings 42 and 44 by being fitted onto either of the first and second axis aligning surfaces 232f and 234f. The axis aligning part 236d is provided on the inner peripheral surface of the large diameter part of the support portion body 236a. The axis aligning part 236d is fitted onto one of the first and second axis aligning surfaces 232f and 234f.

The cover member 238 covers the outer lateral surface of the first or second body 232 or 234 to which the third bearing 46 is not mounted. The cover member 238 is designed to be detachably mountable to the other of the first and second bodies 232 and 234. When the spinning reel 210 is of the left handle type, the cover member 238 is mounted to the first body 232, whereas the handle shaft support portion 236 is mounted to the second body 234. When the spinning reel 210 is of the right handle type, the handle shaft support portion 236 is mounted to the first body 232, whereas the cover member 238 is mounted to the second body 234. The cover member 238 includes a cover part 238a and a plurality of attachment parts 238b (the number of which is preferably from 2 to 6, and is 3 in the third preferred embodiment). The cover part 238a has a saucer shape. The attachment parts 238b radially protrude from the outer peripheral region of the cover part 238a. The attachment parts 238b are preferably aligned at intervals in the circumferential direction. The cover member 238 is detachably mountable to one of the first and second bodies 232 and 234 by the same mount structure as the handle shaft support portion 236.

<Joint Structure>

A joint structure 218 includes a recess 218a and a protrusion 218b. The recess 218a is provided on one of the handle shaft 26 and the drive shaft 16. The protrusion 218b is provided on the other of the handle shaft 26 and the drive shaft 16. The protrusion 218b is engaged with the recess 218a by a non-circular engagement and is unitarily rotatable with the recess 218a. In the third preferred embodiment, as shown in FIG. 9, the recess 218a and the protrusion 218b have rectangular (e.g., square) cross-sections. The joint structure 218 is another example of a joining means.

<Changing a Handle Position>

The position of the handle 12 can be changed for using the spinning reel 210 as either the left handle type or the right handle type. When the handle 12 is relocated from its mount position in the spinning reel 210 of the left handle type shown in FIG. 8 to that in the spinning reel 210 of the right handle type, the handle shaft support portion 236 and the cover member 238 are detached from the spinning reel 210. Specifically, a user detaches six crew members 60 from the spinning reel 210 with a tool. Next, the handle shaft 26 is detached from the drive shaft 16 while the handle arm 28 is held by the hand of the user. At this time, the third bearing 46 is pressed by the annular protrusion 26c of the handle shaft 26 and is attached to the handle shaft 26. Accordingly, the third bearing 46 is detached and is assembled to the handle shaft support portion 236 and the handle shaft 26. Therefore, the handle shaft support portion 236, the third bearing 46, the handle shaft 26 and the handle arm 28 are taken from the second body 234 and are joined to each other without being separated apart from each other.

Then, the cover member 238, detached from the first body 232, is fixed to the second body 234 by the plural screw members 60. Next, the supported part 26d of the handle shaft 26 is fitted to the support hole 16c from the same side as the first body 232, and the protrusion 218b is engaged with the recess 218a of the joint structure 218 by rotating the handle arm 28 in the fishing line winding direction. At this time, rotation of the drive shaft 16 can be prevented by holding the rotor 24 with the hand of the user. Finally, the handle shaft support portion 236 is fixed to the first body 232 by the screw members 60. The third bearing 46 is thus retained. With this procedure, the spinning reel 210 of the right handle type can be obtained similarly to the spinning reel 10 of the right handle type shown in FIG. 5.

Fourth Preferred Embodiment

Figure 10:
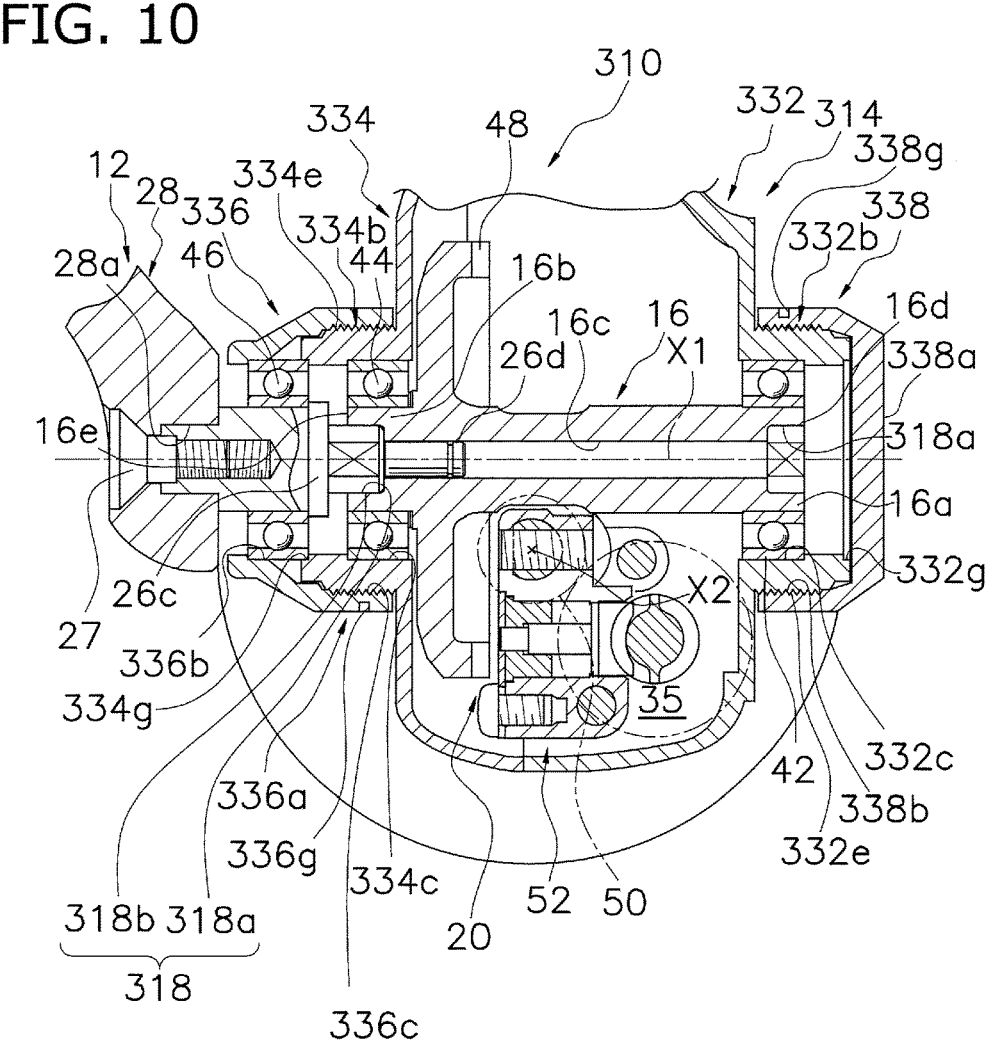
FIG. 10 is an enlarged cross-sectional view of major constituent elements of a spinning reel according to a fourth preferred embodiment of the present disclosure and corresponds to FIG. 3.

As shown in FIG. 10, in a spinning reel 310 according to the fourth preferred embodiment, the third bearing 46 is axially positioned by a handle shaft support portion 336 and one of first and second support parts 332b and 334b. Additionally, similarly to the second preferred embodiment, the handle shaft support portion 336 and a cover member 338 are screwed onto a first body 332 and a second body 334, and are thus detachably fixed to the first body 332 and the second body 334.

In the spinning reel 310, the constructions of the handle 12 and the drive shaft 16 are approximately the same as those of the first preferred embodiment. Therefore, in FIG. 10, the constituent elements of the handle 12 and those of the drive shaft 16 are denoted by the same reference signs as those in FIG. 3, and will not be hereinafter explained.

<Reel Unit>

A reel unit 314 includes the first body 332, the second body 334, the handle shaft support portion 336 and the cover member 338. The first body 332 includes the first support part 332b. The first support part 332b has a tubular shape and protrudes outward in the direction of the first axis X1. The first support part 332b is provided with a first positioning recess 332g annularly recessed on the inner peripheral part of its tip end. The first positioning recess 332g is engaged with the outer peripheral end of the third bearing 46. The first support part 332b includes a first drive shaft support part 332c, by which the first end 16a of the drive shaft 16 is rotatably supported, on its inner peripheral surface. The first bearing 42, by which the first end 16a (the right end in FIG. 10) of the drive shaft 16 is rotatably supported, is mounted to the first drive shaft support part 332c. The first support part 332b is another example of a drive shaft supporting means. The first support part 332b includes a first male threaded part 332e on its outer peripheral surface. The first male threaded part 332e is provided as a mount for mounting one of the handle shaft support portion 336 and the cover member 338. The first male threaded part 332e is another example of a mounting means.

The second body 334 and the first body 332 form the mechanism mount space 35 in which the rotation transmission mechanism 20 can be accommodated. The mechanism mount space 35 is between the second body 334 and the first body 332. Additionally, the second body 334 includes the second support part 334b. The second support part 334b has a tubular shape and protrudes axially outward. The second support part 334b is provided with a second positioning recess 334g annularly recessed on the inner peripheral part of its tip end. The second positioning recess 334g is engaged with the outer peripheral end of the third bearing 46. The second support part 334b includes a second drive shaft support part 334c, by which the second end 16b of the drive shaft 16 is rotatably supported, on its inner peripheral surface. The second bearing 44, by which the second end 16b (the left end in FIG. 10) of the drive shaft 16 is rotatably supported, is mounted to the second drive shaft support part 334c. The second support part 334b is another example of a drive shaft supporting means. The second support part 334b includes a second male threaded part 334e on its outer peripheral surface. The second male threaded part 334e is provided as a mount for mounting the other of the handle shaft support portion 336 and the cover member 338. The second male threaded part 334e is another example of a mounting means.

The handle shaft support portion 336 supports the handle shaft 26 in a different position from the drive shaft 16 such that the handle shaft 26 is rotatable. The handle shaft support portion 336 is designed to be detachably mountable to one of the first and second bodies 332 and 334. The handle shaft support portion 336 includes a support portion body 336a having a stepped tubular shape, a handle shaft mount part 336b and a first female threaded part 336c. The support portion body 336a axially positions and retains the third bearing 46 together with one of the first and second positioning recesses 332g and 334g, while interposing the third bearing 46 between the first and second positioning recesses 332g and 334g. The handle shaft support portion 336 is another example of a handle shaft supporting means. The support portion body 336a includes a first tool lock part 336g on its outer peripheral surface. A tool for an attachment/detachment can be locked to the first tool lock part 336g. The handle shaft mount part 336b is slightly recessed on the inner peripheral surface of the small diameter part of the support portion body 336a, whereby the third bearing 46 is mountable to the handle shaft mount part 336b. The first female threaded part 336c is provided on the inner peripheral surface of the large diameter part of the support portion body 336a so as to be screwed onto one of the first and second male threaded parts 332e and 334e. In the fourth preferred embodiment, the third bearing 46 is axially and radially positioned by the handle shaft support portion 336 and one of the first and second support parts 332b and 334b.

The cover member 338 is designed to be detachably mountable to the other of the first and second bodies 332 and 334. When the spinning reel 310 is of the left handle type, the cover member 338 is mounted to the first body 332, whereas the handle shaft support portion 336 is mounted to the second body 334. When the spinning reel 310 is of the right handle type, the handle shaft support portion 336 is mounted to the first body 332, whereas the cover member 338 is mounted to the second body 334. The cover member 338 includes a cover part 338a having a saucer shape and a second female threaded part 338b provided on the inner peripheral surface of the cover part 338a. The cover part 338a includes a tool lock part 338g on its outer peripheral surface. The aforementioned or another tool for an attachment/detachment can be locked to the tool lock part 338g. For example, an attachment/detachment of the cover member 338 and that of the handle shaft support portion 336 can be done with the same tool. The second female threaded part 338b is screwed onto the other of the first and second male threaded parts 332e and 334e.

<Joint Structure>

Figure 11:
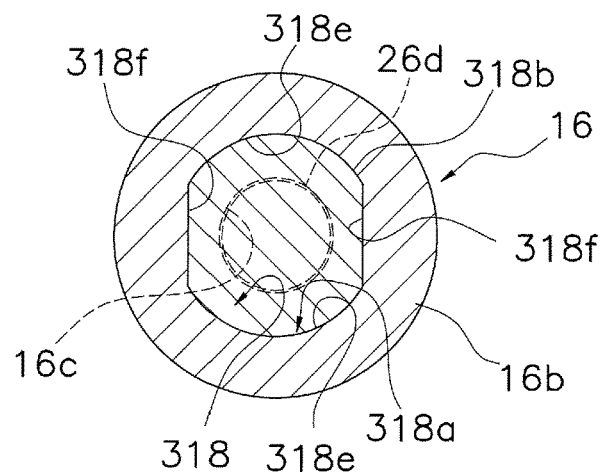
FIG. 11 is a cross-sectional view of some constituent elements (corresponding to the major constituent elements in FIG. 4) of the spinning reel according to the fourth preferred embodiment.

As shown in FIGS. 10 and 11, a joint structure 318 includes a recess 318a and a protrusion 318b. The recess 318a is provided on one of the handle shaft 26 and the drive shaft 16. The protrusion 318b is provided on the other of the handle shaft 26 and the drive shaft 16. The protrusion 318b is engaged with the recess 318a by a non-circular engagement and is unitarily rotatable with the recess 318a. The joint structure 318 is another example of a joining means.

In the fourth preferred embodiment, as shown in FIG. 11, the cross-sectional shape of the recess 318a is a rectangle with rounded ends. This cross-sectional shape is formed by a pair of circular-arc parts 318e and a pair of straight parts 318f. The circular-arc parts 318e are disposed in opposition to each other. The straight parts 318f are disposed in parallel to each other, and are connected to both ends of each circular-arc part 318e. The cross-sectional shape of the protrusion 318b is set for making the protrusion 318b unitarily rotatable with the recess 318a. For example, similarly to the cross-sectional shape of the recess 318a, the cross-sectional shape of the protrusion 318b is set to be a rectangle with rounded ends. Alternatively, the cross-sectional shape of the protrusion 318b is set to be a rectangle.

<Changing a Handle Position>

In the fourth preferred embodiment, the position of the handle 12 can be changed for using the spinning reel 310 as either the left handle type or the right handle type by a procedure similar to that of the handle 12 of the spinning reel 110 in the second preferred embodiment. Hence, detailed explanation of the procedure will not be hereinafter provided. It should be noted that the spinning reel 310 of the fourth preferred embodiment is provided with the first and second positioning recesses 332g and 334g. Therefore, the third bearing 46 is axially and radially positioned by the handle shaft support portion 336 and one of the first and second support parts 332b and 334b.

It should be noted that unlike the second and third preferred embodiments, the handle shaft support portion 336 is not provided with any axis aligning part in the fourth preferred embodiment. However, the handle shaft support portion 336 can be provided with an axis aligning part for coaxially aligning the handle shaft support portion 336 and each of the first and second bodies 332 and 334 with each other.

Fifth Preferred Embodiment

Figure 12:
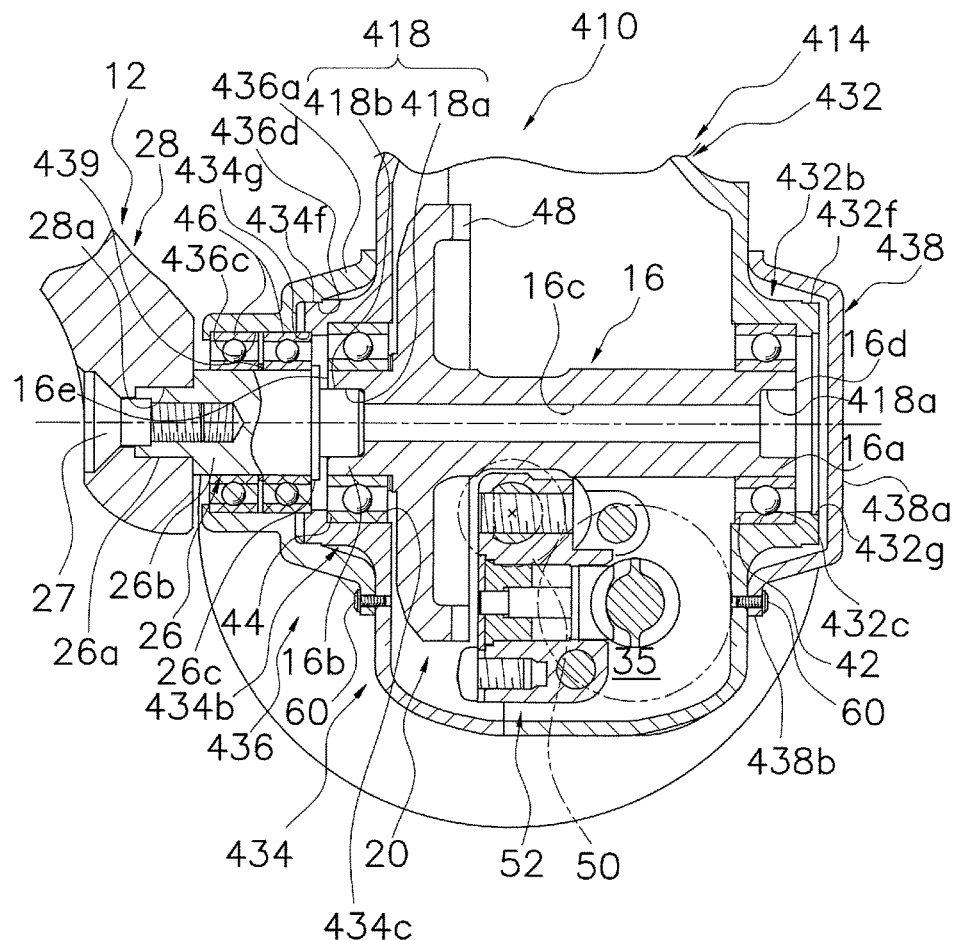
FIG. 12 is an enlarged cross-sectional view of major constituent elements of a spinning reel according to a fifth preferred embodiment of the present disclosure and corresponds to FIG. 3.

As shown in FIG. 12, in a spinning reel 410 according to the fifth preferred embodiment, two third bearings 46 are disposed in axial alignment while supporting the handle shaft 26.

In the spinning reel 410, the constructions of the handle 12 and the drive shaft 16 are approximately the same as those of the first preferred embodiment. Therefore, in FIG. 12, the constituent elements of the handle 12 and those of the drive shaft 16 are denoted by the same reference signs as those in FIG. 3, and will not be hereinafter explained. It should be noted that in the fifth preferred embodiment, the handle shaft 26 is supported by the two third bearings 46, and hence, is not provided with the supported part 26d. Accordingly, the drive shaft 16 might not be provided with the support hole 16c.

<Reel Unit>

A reel unit 414 includes a first body 432, a second body 434, a handle shaft support portion 436 and a cover member 438. The first body 432 includes a first support part 432b. The first support part 432b has a tubular shape and protrudes outward in the direction of the first axis X1. The first support part 432b includes a first drive shaft support part 432c, by which the first end 16a of the drive shaft 16 is rotatably supported, on the inner peripheral surface of its axially inner part. The first support part 432b is another example of a drive shaft supporting means. The first support part 432b is provided with a first positioning recess 432g, by which the third bearing 46 is radially and axially positioned, on the inner peripheral surface of its axially outer part. The first bearing 42, by which the first end 16a (the right end in FIG. 12) of the drive shaft 16 is rotatably supported, is mounted to the first drive shaft support part 432c. The first support part 432b includes a first axis aligning surface 432f on its outer peripheral surface. The first axis aligning surface 432f is provided for coaxially aligning the handle shaft support portion 436 with the first body 432. The first axis aligning surface 432*f* can axially and radially position the handle shaft support portion 436.

The second body 434 and the first body 432 form the mechanism mount space 35 in which the rotation transmission mechanism 20 can be accommodated. The mechanism mount space 35 is between the second body 434 and the first body 432. Additionally, the second body 434 includes a second support part 434*b*. The second support part 434*b* has a tubular shape and protrudes axially outward. The second support part 434*b* includes a second drive shaft support part 434*c*, by which the second end 16*b* of the drive shaft 16 is rotatably supported, on its inner peripheral surface. The second support part 434*b* is another example of a drive shaft supporting means. The second bearing 44, by which the second end 16*b* (the left end in FIG. 8) of the drive shaft 16 is rotatably supported, is mounted to the second drive shaft support part 434*c*. The second support part 434*b* includes a second axis aligning surface 434*f* on its outer peripheral surface. The second axis aligning surface 434*f* is provided for coaxially aligning the handle shaft support portion 436 with the second body 434. The second support part 434*b* is provided with a second positioning recess 434*g* annularly recessed on the inner peripheral part of its tip end. The second positioning recess 434*g* is engaged with the outer peripheral end of the third bearing 46.

The handle shaft support portion 436 supports the handle shaft 26 in a different position from the drive shaft 16 such that the handle shaft 26 is rotatable. The handle shaft support portion 436 is designed to be detachably mountable to one of the first and second bodies 432 and 434. The handle shaft support portion 436 includes a support portion body 436*a* and a plurality of attachment parts 436*b* (the number of which is preferably from 2 to 6, and is 3 in the fifth preferred embodiment), a handle shaft mount part 436*c* and an axis aligning part 436*d*. The handle shaft support portion 436 is another example of a handle shaft supporting means. The support portion body 436*a* has a taper shape and is provided with an opening in its bottom. The attachment parts 436*b* radially protrude from the outer peripheral part of the support portion body 436*a*. The attachment parts 436 are preferably aligned at intervals in the circumferential direction.

The plural attachment parts 436*b* are fixed to one of the first body 432 and the second body 434 by the screw members 60. When the spinning reel 410 is of the left handle type, the plural attachment parts 436*b* are fixed to the second body 434. On the other hand, when the spinning reel 410 is of the right handle type, the plural attachment parts 436*b* are fixed to the first body 432.

The handle shaft mount part 436*c* is slightly recessed on the inner peripheral surface of the small diameter part of the support portion body 436*a*. The handle shaft mount part 436*c* is designed as a mount for mounting two third bearings 46. A spacer 439 is disposed on the inner peripheral side within a space produced between the two third bearings 46. The handle shaft mount part 436*c* retains the third bearings 46 such that the third bearings 46 are positioned so as not to be moved axially toward the handle 12.

The axis aligning part 436*d* is provided for coaxially aligning the third bearings 46 with one of the first and second bearings 42 and 44 by being fitted onto either of the first and second axis aligning surfaces 432*f* and 434*f*. The axis aligning part 436*d* is provided on the inner peripheral surface of the large diameter part of the support portion body 436*a*. The axis aligning part 436*d* is fitted onto one of the first and second axis aligning surfaces 432*f* and 434*f*.

The cover member 438 covers the outer lateral surface of the first or second body 432 or 434 to which the third bearings 46 are not mounted. The cover member 438 is designed to be detachably mountable to the other of the first and second bodies 432 and 434. When the spinning reel 410 is of the left handle type, the cover member 438 is mounted to the first body 432, whereas the handle shaft support portion 436 is mounted to the second body 434. When the spinning reel 410 is of the right handle type, the handle shaft support portion 436 is mounted to the first body 432, whereas the cover member 438 is mounted to the second body 434. The cover member 438 includes a cover part 438*a*, a plurality of attachment parts 438*b* (the number of which is preferably from 2 to 6, and is 3 in the fifth preferred embodiment). The cover part 438*a* has a saucer shape. The attachment parts 438*b* radially protrude from the outer peripheral region of the cover part 438*a*. The attachment parts 438*b* are preferably aligned at intervals in the circumferential direction. The cover member 438 is detachably mountable to one of the first and second bodies 432 and 434 by the same mount structure as the handle shaft support portion 436.

<Joint Structure>

A joint structure 418 includes a recess 418*a* and a protrusion 418*b*. The joint structure 418 is another example of a joining means. The recess 418*a* is provided on one of the handle shaft 26 and the drive shaft 16. The protrusion 418*b* is provided on the other of the handle shaft 26 and the drive shaft 16. The protrusion 418*b* is engaged with the recess 418*a* by a non-circular engagement and is unitarily rotatable with the recess 418*a*. In the fifth preferred embodiment, a pair of recesses 418*a* is provided on the drive shaft 16 along the axial direction. Specifically, the pair of recesses 418*a* is provided on the first end surface 16*d* of the first end 16*a* and the second end surface 16*e* of the second end 16*b*. The protrusion 418*b* is provided to protrude from the annular protrusion 26*c* of the handle shaft 26 along the axial direction.

Figure 13:
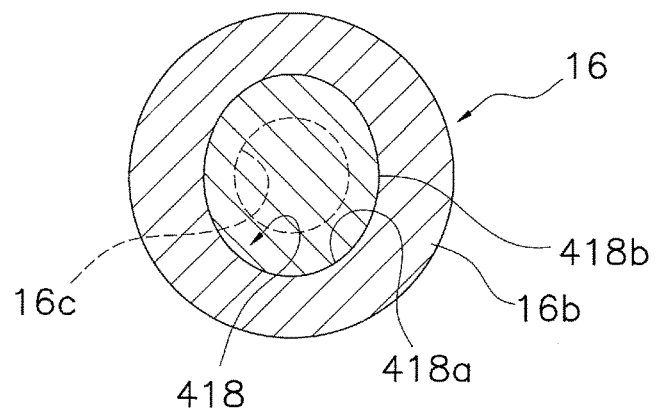
FIG. 13 is a cross-sectional view of some constituent elements (corresponding to the major constituent elements in FIG. 4) of the spinning reel according to the fifth preferred embodiment.

The support hole 16*c* is opened in the pair of recesses 418*a*. The pair of recesses 418*a* and the single protrusion 418*b* have non-circular cross-sections. In the fifth preferred embodiment, as shown in FIG. 13, the recesses 418*a* and the protrusion 418*b* have oval cross-sections.

<Changing a Handle Position>

The position of the handle 12 can be changed for using the spinning reel 410 as either the left handle type or the right handle type. When the handle 12 is relocated from its mount position in the spinning reel 410 of the left handle type to that in the spinning reel 410 of the right handle type, this can be done by a procedure similar to that of the handle 12 of the spinning reel 210 according to the third preferred embodiment shown in FIG. 8. Hence, detailed explanation thereof will not be hereinafter provided.

It should be noted that the spinning reel 410 of the fifth preferred embodiment is provided with the first and second positioning recesses 432*g* and 434*g*. Therefore, the third bearings 46 are axially and radially positioned by the handle shaft support portion 436 and one of the first and second support parts 432*b* and 434*b*.

Features

The aforementioned preferred embodiment can be expressed as follows.

(A) The spinning reel 10 is a reel that forwardly releases the fishing line. The spinning reel 10 includes the reel unit 14, the handle 12, the drive shaft 16, the joint structure 18, the rotation transmission mechanism 20, the spool 22 for winding the fishing line, and the rotor 24. The handle 12 includes the handle shaft 26 and the handle arm 28. The handle shaft 26 is rotatably supported by the reel unit 14. The handle arm 28 is mounted to the handle shaft 26 so as to be unitarily rotatable with the handle shaft 26. The handle arm 28 extends in the radial direction of the handle shaft 26. The drive shaft 16 includes the first end 16*a* and the second end 16*b* located oppositely to the first end 16*a*. The drive shaft 16 is rotatably supported by the reel unit 14 in the different position from the handle shaft 26. The joint structure 18 joins the handle shaft 26 and the drive shaft 16 such that the handle shaft 26 and the drive shaft 16 are unitarily rotatable. The rotation transmission mechanism 20 includes the drive gear 48 and the pinion gear 50. The drive gear 48 is mounted to the drive shaft 16 so as to be unitarily rotatable with the drive shaft 16. The pinion gear 50 is disposed in the back-and-forth direction so as to be skew to the drive shaft 16. The pinion gear 50 is meshed with the drive gear 48. The spool 22 for winding the fishing line is supported by the reel unit 14 so as to be movable back and forth. The rotor 24 is coupled to the pinion gear 50 so as to be unitarily rotatable with the pinion gear 50 at least in the fishing line winding direction. The rotor 24 winds the fishing line about the spool 22.

In the spinning reel 10, the handle shaft 26 and the drive shaft 16 are rotatably supported by the reel unit 14 in different positions. The handle shaft 26 and the drive shaft 16, which are separately supported, are joined by the joint structure 18 so as to be unitarily rotatable with each other. The handle shaft 26 and the drive shaft 16, which are supported in different positions, are joined through the joint structure 18. Therefore, the drive shaft 16 is unlikely to tilt even when a load is exerted on the handle 12. Consequently, even when a load is exerted on the handle 12, deformation of either or both of the drive gear 48 and the pinion gear 50 can be inhibited.

(B) The joint structure 18 can detachably join the handle shaft 26 and the drive shaft 16 to each other in the axial direction. According to this construction, a slight gap is produced between the handle shaft 26 and the drive shaft 16. Hence, even when a load is exerted on the handle shaft 26, the drive shaft 16 is less likely to tilt. Additionally, the handle shaft 26 is attachable to either of the first and second ends 16*a* and 16*b* of the drive shaft 16.

(C) The reel unit 14 can include the first body 32 and the second body 34. The first body 32 can support the first end 16*a* of the drive shaft 16 such that the first end 16*a* is rotatable. The first body 32 can support the pinion gear 50 such that the pinion gear 50 is rotatable. The second body 34 can support the second end 16*b* of the drive shaft 16 such that the second end 16*b* is rotatable. The second body 34 forms the mechanism mount space 35 together with the first body 32. The mechanism mount space 35 is between the second body 34 and the first body 32. The mechanism mount space 35 accommodates the rotation transmission mechanism 20. According to this construction, the drive shaft 16 can be supported by the first body 32 and the second body 34. Hence, the drive shaft 16 can be easily assembled to the reel unit 14.

(D) The first body 32 can include the first drive shaft support part 32*c* to which the first bearing 42 is mounted. The first bearing 42 supports the first end 16*a* of the drive shaft 16 such that the first end 16*a* is rotatable. The second body 34 can include the second drive shaft support part 34*c* to which the second bearing 44 is mounted. The second bearing 44 supports the second end 16*b* of the drive shaft 16 such that the second end 16*b* is rotatable. The reel unit 14 can include the handle shaft support portion 36. The handle shaft support portion 36 is disposed away from one of the first and second drive shaft support parts 32*c* and 34*c* in the axial direction. The handle shaft support portion 36 enables at least one third bearing 46 to be mounted to the handle shaft support portion 36. The handle shaft support portion 36 is an example of a handle shaft supporting means. The at least one third bearing 46 supports the handle shaft 26 such that the handle shaft 26 is rotatable. According to this construction, the drive shaft 16 and the handle shaft 26 are separately supported. Hence, the drive shaft 16 and the handle shaft 26 can be easily assembled to the reel unit 14.

(E) The reel unit 14 can include the cover member 38. The cover member 38 covers the outer lateral surface of the first or second body 32 or 34 to which the at least one third bearing 46 is not mounted. According to this construction, the outer lateral surface of the first or second body 32 or 34 to which the at least one third bearing 46 is not mounted is thus covered with the cover member 38. Hence, foreign objects (liquid, fishing bait, etc.) become unlikely to intrude into the interior of the reel body 14.

(F) The handle shaft support portion 36 can be designed to be permanently mounted to at least one of the first and second bodies 32 and 34. According to this construction, the handle shaft support portion 36 is thus permanently mounted to at least one of the first and second bodies 32 and 34. Hence, the rotational axis of at least one of the first and second drive shaft support parts 32*c* and 34*c* and that of the handle shaft support portion 36 can be arranged with good precision.

(G) The reel unit 14 can include the retainer member 40. The retainer member 40 is designed to be detachably mountable to one of the first and second bodies 32 and 34. The retainer member 40 retains the at least one third bearing 46. The cover member 38 can be designed to be detachably mountable to the other of the first and second bodies 32 and 34 by the mount structure of the same type as the retainer member 40. According to this construction, the mount structure of the retainer member 40 and that of the cover member 38 are of the same type. Hence, even when the handle shaft support portion 36 is designed to be non-detachable, it is easy for a user to perform a positional change of the handle 12 (from the position in the spinning reel 10 of the right handle type to the position in the spinning reel 10 of the left handle type or vice versa) in accordance with preference of the user or so forth.

(H) The handle shaft support portion 136 can be designed to be detachably mountable to one of the first and second bodies 132 and 134. According to this construction, the handle shaft support portion 136, supporting the handle shaft 126, is mountable to either of the first and second bodies 132 and 134. Hence, the position of the handle 112 can be changed (from the position in the spinning reel 110 of the right handle type to the position in the spinning reel 110 of the left handle type or vice versa) in accordance with a preference of the user or so forth.

(I) The cover member 138 can be designed to be detachably mountable to the other of the first and second bodies 132 and 134 by the mount structure of the same type as the handle shaft support portion 136. According to this construction, the mount structure of the handle shaft support portion 136 and that of the cover member 138 are of the same type. Hence, it is easy for the user to perform a positional change of the handle 112 (from the position in the spinning reel 110 of the right handle type to the position in the spinning reel of the left handle type or vice versa) in accordance with a preference of the user or so forth.

(J) The joint structure 18 can include the recess 18*a* and the protrusion 18*b*. The recess 18*a* is provided on one of the handle shaft 26 and the drive shaft 16. The protrusion 18*b* is provided on the other of the handle shaft 26 and the drive shaft 16, and is engaged with the recess 18*a* so as to be unitarily rotatable with the recess 18*a*. According to this construction, the handle shaft 26 and the drive shaft 16 are joined by a protrusion-recess fitting. Hence, the joint structure 18 can be simply constructed.

(K) The recess 18*a* and the protrusion 18*b* can be engaged by a non-circular engagement. According to this construction, the drive shaft 16 and the handle shaft 26 can be joined to each other in a unitarily rotatable manner with a simple construction using a non-circular engagement. The non-circular shape used in this non-circular engagement is a polygon, a rectangular shape with rounded ends, or so forth.

(L) The recess 18*a* can be recessed on the drive shaft 16 along the axial direction, whereas the protrusion 18*b* can protrude from the handle shaft 26 along the axial direction. According to this construction, without elongating the drive shaft 16 in the axial direction, it is possible to simply construct the joint structure 18 whereby the drive shaft 16 and the handle shaft 26 are unitarily rotatable, axially movable, and detachably attached to each other.

(M) The drive shaft 16 can include the support hole 16*c*. The support hole 16*c* has a circular shape and is opened in the recess 18*a*. The handle shaft 26 can include the supported part 26*d*. The supported part 26*d* has a circular shape and protrudes further from the protrusion 18*b* in the axial direction. The supported part 26*d* is fitted to the support hole 16*c*. According to this construction, the handle shaft 26 is also supported by the drive shaft 16, which is unitarily rotated with the handle shaft 26. Hence, the handle shaft 26 becomes less likely to tilt.

(N) The supported part 26*d* can include the relief part 26*e* and the fitting part 26*f*. The relief part 26*e* extends from the protrusion 18*b* in the axial direction. The relief part 26*e* is separated by a gap from the support hole 16*c*. The fitting part 26*f* has a larger diameter than the relief part 26*e*. The fitting part 26*f* contacts the support hole 16*c*. According to this construction, an axial tilt of the handle shaft 26 can be prevented by the fitting part 26*f*, while the supported part 26*d* can be easily attached to the support hole 16*c* by the relief part 26*e*.

(O) The fitting part 26*f* can be elastically fitted to the support hole 16*c*. According to this construction, the fitting part 26*f* is elastically fitted to the support hole 16*c*. Hence, a wobble of the drive shaft 16 can be inhibited.

Other Preferred Embodiments

Preferred embodiments of the present disclosure have been explained above. However, the present disclosure is not limited to the above, and a variety of changes can be made without departing from the scope of the present disclosure. Especially, a plurality of embodiments and modifications described in the present specification can be arbitrarily combined on an as-needed basis.

Figure 14:
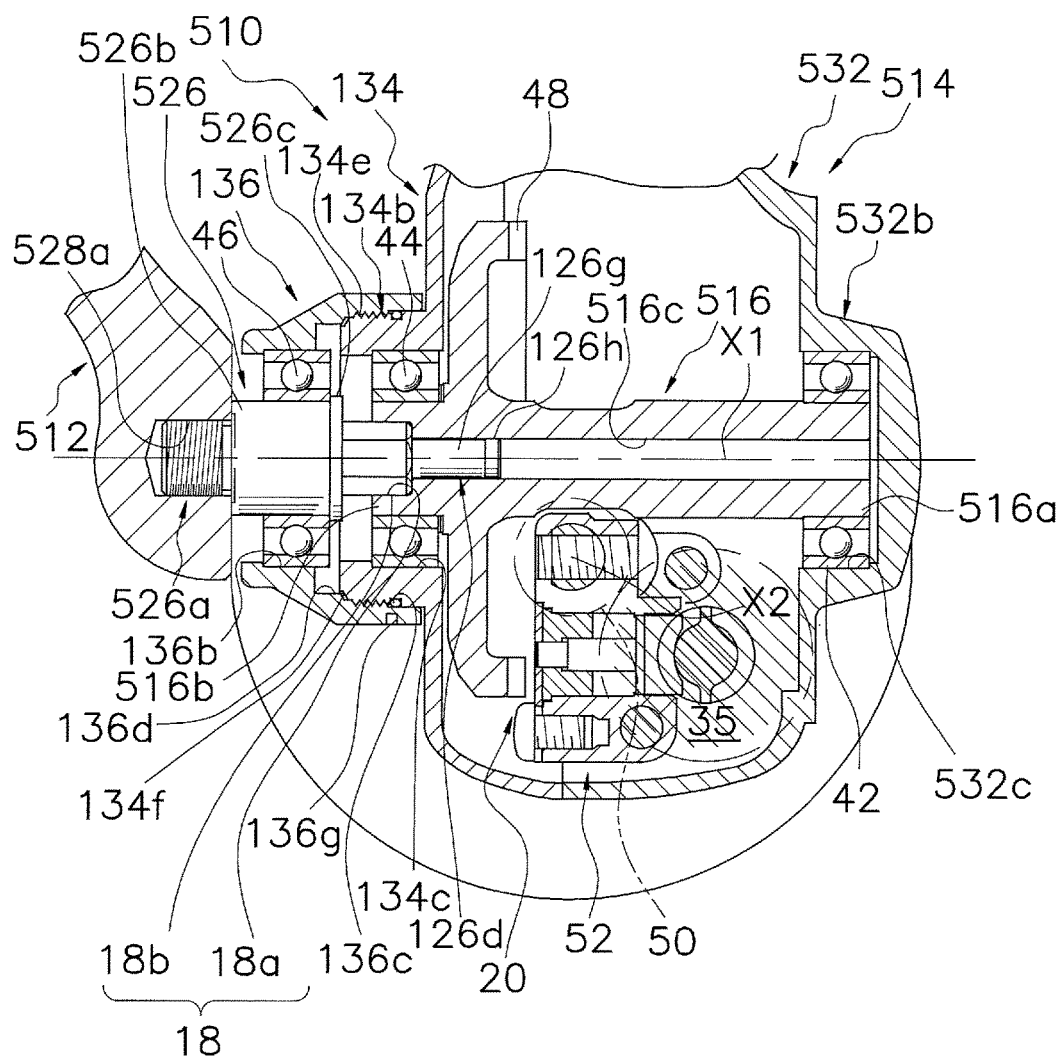
FIG. 14 is an enlarged cross-sectional view of major constituent elements of a spinning reel according to another preferred embodiment (a) of the present disclosure and corresponds to FIG. 3.

(a) The spinning reels described in the aforementioned preferred embodiments are usable as both the right handle type and the left handle type. However, the present disclosure is not limited to the spinning reels usable as both types. As shown in FIG. 14, the present disclosure is applicable to a spinning reel 510 designed exclusively as the left handle type (or the right handle type).

For example, the spinning reel 510 shown in FIG. 14 is designed exclusively as the left handle type. The third bearing 46 is supported by the handle shaft support portion 136 constructed similarly to that of the second preferred embodiment. Additionally, the handle shaft support portion 136 is detachably screwed onto the second body 134 of a reel unit 514. The second body 134 is constructed similarly to that of the second preferred embodiment.

A drive shaft 516 includes a first end 516*a*, a second end 516*b* and a support hole 516*c*. The spinning reel 510 is not provided with any cover member, and therefore, covers the first end 516*a* of the drive shaft 516 with a first support part 532*b* of a first body 532 including a first drive shaft support part 532*c*. The first support part 132*b* is another example of a drive shaft supporting means.

A handle shaft 526 of a handle 512 includes a joint part 526*a*, a shaft part 526*b*, an annular protrusion 526*c* for a retaining purpose and the supported part 126*d*. The joint part 526*a* joins a handle arm 528 to the handle shaft 526, whereby the handle 528 is unitarily rotatable with the handle shaft 526. The joint part 526*a* includes a male threaded part 526*h*. When the spinning reel 510 is of the left handle type, the male threaded part 526*h* is of a left hand threaded type. On the other hand, when the spinning reel 510 is of the right handle type, the male threaded part 526*h* is of a right hand threaded type. The shaft part 526*b* is rotatably supported by the reel unit 514. The annular protrusion 526*c* is disposed between the second bearing 44 and the third bearing 46. The annular protrusion 526*c* is retained by the handle shaft support portion 136 through the third bearing 46. With this construction, the handle shaft 526 is retained. The supported part 126*d* has the same construction as that of the second preferred embodiment, and hence, will not be hereinafter explained.

The handle arm 528 includes a female threaded hole 528*a* to be screwed onto the male threaded part 526*h*. The handle arm 528 is rotated in the fishing line winding direction while rotation of the drive shaft 516 is prevented by holding the rotor 24 with the hand of a user. Accordingly, the handle arm 528 is fixed to the handle shaft 526.

The joint structure 18 is constructed similarly to that of the first preferred embodiment. However, the spinning reel 510 is designed exclusively for the left handle type. Hence, the drive shaft 516 is not provided with the recess 18*a* on the first end 516*a*. The other constituent elements are the same as those of the second preferred embodiment. Therefore, the other constituent elements are denoted by the same reference signs as those of the second preferred embodiment, and will not be hereinafter explained.

It should be noted that when the spinning reel 510 constructed as described above is designed to be switchable from the left handle type to the right handle type or vice versa, the reel unit 114 of the second preferred embodiment can be used for the spinning reel 510. In this construction, one pair of a handle arm and a handle shaft, which is of a left threaded type, can be prepared for the spinning reel 510 of the right handle type, whereas another pair of a handle arm and a handle shaft, which is of a right threaded type, can be prepared for the spinning reel 510 of the right handle type.

(b) In the aforementioned preferred embodiments, the present disclosure has been explained by exemplifying the spinning reels of the front drag type. However, the present disclosure is not limited to the spinning reels of the front drag type. The present disclosure is also applicable to spinning reels of a rear drag type, a rotor brake type, a closed face type and an in-spool (non-skirted) type.

(c) In the aforementioned preferred embodiments, the joint structure 18 is constructed such that the drive shaft 16 is provided with the recess 18*a* whereas the handle shaft 26 is provided with the protrusion 18b. However, contrary to this construction, the drive shaft 16 can be provided with a protrusion whereas the handle shaft 26 can be provided with a recess.

(d) In the aforementioned preferred embodiments, the reel units are designed to be divided into halves in the right-and-left direction. However, the present disclosure is applicable to a type of spinning reel designed to be divided into three parts in the right-and-left direction.

(e) In the aforementioned preferred embodiments, rolling-element bearings are employed as the first bearing 42, the second bearing 44 and the third bearings 46. However, these bearings 42, 44 and 46 are not limited to rolling-element bearings. For example, slide bearings such as tubular bushings can be employed as these bearings 42, 44 and 46.

(f) In each of the first to fifth preferred embodiments and another preferred embodiment (a), the structure for attaching the handle shaft and the handle arm to each other and the structure for joining the handle shaft and the drive shaft to each other are not particularly limited to those described in each of them. The structures in each of the preferred embodiments can be combined to those in the other or others of the preferred embodiments and can be replaced by heretofore known structures.

What is claimed is:

1. A spinning reel that forwardly releases a fishing line, the spinning reel comprising:
    a reel unit;
    a handle including a handle shaft and a handle arm, the handle shaft rotatably supported by the reel unit at a first position, the handle arm mounted to the handle shaft and unitarily rotatable with the handle shaft, the handle arm extending in a radial direction from a rotational axis of the handle shaft;
    a drive shaft including a first end and a second end located opposite to the first end, the drive shaft rotatably supported by the reel unit at a second position different from the first position;
    a joint structure joining the handle shaft and the drive shaft such that the handle shaft is unitarily rotatable with the drive shaft; and
    a rotation transmission mechanism including a drive gear and a pinion gear, the drive gear mounted to the drive shaft and unitarily rotatable with the drive shaft, the pinion gear disposed in a back-and-forth direction so as to be skew to the drive shaft, the pinion gear being meshed with the drive gear, wherein
    the joint structure includes
    a recess on one of the handle shaft and the drive shaft, and
    a protrusion on the other of the handle shaft and the drive shaft, the protrusion engaged with the recess and unitarily rotatable with the recess.

2. The spinning reel according to claim 1, wherein the joint structure detachably joins the handle shaft and the drive shaft to each other in an axial direction parallel to the rotational axis of the handle shaft.

3. The spinning reel according to claim 1, wherein the reel unit includes
    a first body including a first bearing supporting the first end of the drive shaft such that the first end is rotatable, the first body supporting the pinion gear such that the pinion gear is rotatable, and
    a second body including a second bearing supporting the second end of the drive shaft such that the second end is rotatable, and
    the rotation transmission mechanism is in a mechanism mount space between the first body and the second body.

4. The spinning reel according to claim 3, wherein
    the first body includes a first drive shaft support part to which the first bearing is mounted,
    the second body includes a second drive shaft support part to which the second bearing is mounted, and
    the reel unit further includes a handle shaft support portion and at least one third bearing, the handle shaft support portion being away from one of the first drive shaft support part and the second drive shaft support part in an axial direction parallel to the rotational axis of the handle shaft, the at least one third bearing mounted to the handle shaft support portion, the at least one third bearing supporting the handle shaft such that the handle shaft is rotatable.

5. The spinning reel according to claim 4, wherein the reel unit further includes a cover member, the handle shaft support portion is disposed on one of the first body or the second body, and
    the cover member covers an outer lateral surface of the first or second body to which the at least one third bearing is not mounted.

6. The spinning reel according to claim 5, wherein the handle shaft support portion is permanently mounted to at least one of the first body and the second body.

7. The spinning reel according to claim 6, wherein
    the reel unit further includes a retainer member, the retainer member having a mount structure detachably mountable to one of the first body and the second body, the retainer member retaining the at least one third bearing, and
    the cover member is detachably mountable to the other of the first body and the second body by a mount structure.

8. The spinning reel according to claim 5, wherein the handle shaft support portion is detachably mountable to one of the first body and the second body.

9. The spinning reel according to claim 8, wherein the cover member is detachably mountable to the other of the first body and the second body by a mount structure.

10. The spinning reel according to claim 4, wherein the reel unit further includes mounting means for interchangeably mounting a cover member and the handle shaft support portion to the reel unit.

11. The spinning reel according to claim 1, wherein the recess and the protrusion are engaged by a non-circular engagement.

12. The spinning reel according to claim 1, wherein
    the recess is recessed on the drive shaft along an axial direction parallel to the rotational axis of the handle shaft, and
    the protrusion protrudes from the handle shaft along the axial direction.

13. The spinning reel according to claim 12, wherein
    the drive shaft includes a support hole, the support hole having a circular shape, the support hole opened in the recess, and
    the handle shaft includes a supported part, the supported part having a circular shape, the supported part extending from the protrusion in the axial direction, the supported part fitted to the support hole.

14. The spinning reel according to claim 13, wherein the supported part includes a relief part and a fitting part, the relief part extending from the protrusion in the axial direction, the relief part separated by a gap from the support hole, the fitting part having a larger diameter than the relief part, the fitting part contacting the support hole.

15. The spinning reel according to claim 14, wherein the fitting part is elastically fitted to the support hole.

16. The spinning reel according to claim 1, further comprising:
  a spool for winding the fishing line, the spool supported by the reel unit to be movable back and forth; and
  a rotor coupled to the pinion gear to be unitarily rotatable with the pinion gear at least in a fishing line winding direction, the rotor to wind the fishing line about the spool.

17. A spinning reel for forwardly releasing a fishing line, the spinning reel comprising:
  a handle including a handle shaft and a handle arm, the handle arm mounted to the handle shaft and unitarily rotatable with the handle shaft, the handle arm extending in a radial direction from a rotational axis of the handle shaft;
  a drive shaft unitarily rotatable with the handle shaft;
  joining means for joining the handle shaft and the drive shaft; and
  a reel unit including
    handle shaft supporting means for rotatably supporting the handle shaft at a first position, and
    drive shaft supporting means for rotatably supporting the drive shaft at a second position, wherein
  the joining means includes
    a recess on one of the handle shaft and the drive shaft, and
    a protrusion on the other of the handle shaft and the drive shaft, the protrusion engaged with the recess and unitarily rotatable with the recess.

18. The spinning reel according to claim 17, wherein the joining means detachably joins the handle shaft and the drive shaft.

19. The spinning reel according to claim 18, wherein the reel unit further includes another drive shaft supporting means for rotatably supporting the drive shaft at a third position.

* * * * *